(12) United States Patent
Line et al.

(10) Patent No.: US 10,286,818 B2
(45) Date of Patent: May 14, 2019

(54) DUAL SUSPENSION SEATING ASSEMBLY

(71) Applicant: Ford Global Technologies, LLC, Dearborn, MI (US)

(72) Inventors: Johnathan Andrew Line, Northville, MI (US); Daniel Ferretti, Commerce Township, MI (US); John Wayne Jaranson, Dearborn, MI (US); Marcos Silva Kondrad, Macomb, MI (US); Michael Kolich, Windsor (CA); S. M. Akbar Berry, Windsor (CA); Carol Diane Casey, Dearborn, MI (US); David Andree, Commerce Township, MI (US); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 15/591,891

(22) Filed: May 10, 2017

(65) Prior Publication Data
US 2017/0267141 A1    Sep. 21, 2017

Related U.S. Application Data

(63) Continuation-in-part of application No. 15/096,364, filed on Apr. 12, 2016, now Pat. No. 10,046,681, and
(Continued)

(51) Int. Cl.
*B60N 2/62*        (2006.01)
*B60N 2/02*        (2006.01)
(Continued)

(52) U.S. Cl.
CPC ............. *B60N 2/62* (2013.01); *B60N 2/0284* (2013.01); *B60N 2/502* (2013.01); *B60N 2/54* (2013.01); *B60N 2/99* (2018.02)

(58) Field of Classification Search
None
See application file for complete search history.

(56) References Cited

U.S. PATENT DOCUMENTS

| 616,178 A | 12/1898 | Barron |
| 771,773 A | 10/1904 | Feely |

(Continued)

FOREIGN PATENT DOCUMENTS

| CN | 201650491 U | 11/2010 |
| CN | 203097995 U | 7/2013 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — David E Allred
(74) *Attorney, Agent, or Firm* — Vichit Chea; Price Heneveld LLP

(57) ABSTRACT

A vehicle seating assembly includes a seatback and a seat base. The seat base is operably coupled to the seatback. The seat base includes a first suspension assembly and a second suspension assembly. The first suspension assembly includes a seat pan assembly and a seat cushion assembly. The seat cushion assembly is positioned above the seat pan assembly. The second suspension assembly includes a plurality of independent thigh supports operably coupled to a forward portion of the seat pan.

5 Claims, 16 Drawing Sheets

Related U.S. Application Data a continuation-in-part of application No. 15/071,947, filed on Mar. 16, 2016, now Pat. No. 9,849,817.

(51) Int. Cl.
  *B60N 2/50* (2006.01)
  *B60N 2/54* (2006.01)
  *B60N 2/90* (2018.01)

(56) References Cited

U.S. PATENT DOCUMENTS

| | | |
|---|---|---|
| 1,125,155 A | 1/1915 | Nunn |
| 2,272,505 A | 2/1942 | Biggs |
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A * | 5/1975 | Shephard ............... B60N 2/62 297/201 |
| 3,885,831 A | 5/1975 | Rasmussen |
| 3,915,421 A | 10/1975 | Le Forestier |
| 3,929,374 A | 12/1975 | Hogan et al. |
| 3,954,245 A * | 5/1976 | Costin .................. B60N 2/235 248/550 |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Goldner |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,707,027 A | 11/1987 | Horvath et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,022,709 A * | 6/1991 | Marchino ............... B60N 2/667 297/452.24 |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |

(56) References Cited

U.S. PATENT DOCUMENTS

| | | |
|---|---|---|
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |
| 5,823,620 A | 10/1998 | Le Caz |
| 5,826,938 A | 10/1998 | Yanase et al. |
| 5,836,648 A | 11/1998 | Karschin et al. |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Crimmins et al. |
| 5,902,014 A | 5/1999 | Dinkel et al. |
| 5,906,586 A | 5/1999 | Graham |
| 5,913,568 A | 6/1999 | Brightbill et al. |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Wu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Seo |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | Mack |
| 6,419,317 B1 | 7/2002 | Westrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Wohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | VanSickle |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |

(56) References Cited

U.S. PATENT DOCUMENTS

| | | |
|---|---|---|
| 7,059,678 B1 | 6/2006 | Taylor |
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 3,011,728 A1 | 9/2011 | Kohl et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,123,296 B2 | 2/2012 | Rager et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |

(56) References Cited

U.S. PATENT DOCUMENTS

| | | |
|---|---|---|
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,696,067 B2 | 4/2014 | Galbreath et al. |
| 8,702,120 B2 | 4/2014 | Kalisz et al. |
| 8,727,374 B1 | 5/2014 | Line et al. |
| 8,752,894 B2 | 6/2014 | Trimbom et al. |
| 8,794,707 B2 | 8/2014 | Bocsanyi et al. |
| 8,807,594 B2 | 8/2014 | Mizobata |
| 8,827,371 B2 | 9/2014 | Brncick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,126,504 B2 | 9/2015 | Line et al. |
| 9,126,508 B2 | 9/2015 | Line et al. |
| 2001/0011812 A1 | 8/2001 | Seki et al. |
| 2001/0022458 A1* | 9/2001 | Kuster .................. B60N 2/449 297/284.2 |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0201660 A1* | 10/2003 | Janscha .................. B60N 2/502 297/216.17 |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0242264 A1* | 11/2005 | John .................. B60N 2/502 248/424 |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |

(56) References Cited

U.S. PATENT DOCUMENTS

| | | |
|---|---|---|
| 2011/0109128 A1 | 5/2011 | Axakov et al. |
| 2011/0121624 A1 | 5/2011 | Brncick et al. |
| 2011/0133435 A1 | 6/2011 | Sadr et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1* | 10/2013 | Arant ............... B60N 2/62 297/284.1 |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0283970 A1 | 10/2015 | Line et al. |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |

(56) References Cited

FOREIGN PATENT DOCUMENTS

| | | |
|---|---|---|
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| WO | WO9511818 A1 | 5/1995 |
| WO | 9534449 A1 | 12/1995 |
| WO | 9815435 A1 | 4/1998 |
| WO | 9831992 A1 | 7/1998 |
| WO | WO9958022 A1 | 11/1999 |
| WO | 0021797 A1 | 4/2000 |
| WO | 0144026 A1 | 6/2001 |
| WO | WO2006131189 A1 | 12/2006 |
| WO | 2007009893 A2 | 1/2007 |
| WO | WO2007028015 A2 | 3/2007 |
| WO | 2008019981 A1 | 2/2008 |
| WO | WO2008073285 A1 | 6/2008 |
| WO | 2010096307 A1 | 8/2010 |
| WO | WO2011021952 A1 | 2/2011 |
| WO | 2011068684 A1 | 6/2011 |
| WO | WO2012008904 A1 | 1/2012 |
| WO | 2012138699 A1 | 10/2012 |
| WO | 2013040085 A2 | 3/2013 |
| WO | 2013070905 A1 | 5/2013 |
| WO | 2013101644 A1 | 7/2013 |
| WO | 2014047417 A1 | 3/2014 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page) [Accessed from the internet Apr. 10, 2013].
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Brose India Automotive Systems, "Adaptive Sensor Controlled Headrest," http://www.indiamart.com/broseindiaautomotivesystems/products.html, Oct. 9, 2012 (12 pages).
eCoustics.com, "Cineak Motorized Articulating Headrest Preview," http://www.ecoustics.com/ah/reviews/furniture/accessories/cineak-motorized-headrest, Oct. 9, 2012 (3 pages).
"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.
"Imola Pro-fit", Cobra, (http://cobra.subesports.com/products/cat/seats/brand/Cobra/prodID/656), Date unknown, 2 pages.
Freedman Seating Company, "Go Seat," http://www.freedmanseating.com/images/uploads/files/GOSeat_Brochure_10-19.pdf, (date unknown), 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
"Seat Comfort Systems", Installation Manual, KIT P/N: SCSOOOOOC3, http://www.techwebasto.com/accessories_main/seat_accessories/g_scs_vent_install.pdf, (date unknown), 7 pgs.
Car Reviews, "Audi A4 Saloon RS4", http://www.theaa.com/allaboutcars/cartestreports/2006037.html, Apr. 2006, 5 pgs.
Recaro GMBH & Co. KG, "Seat Range", ID No. 7218054, Mar. 2010, 21 pgs.
Kelley Blue Book, "2011 Mercedes-Benz CL-Class", http://www.kbb.com/mercedes-benz/cl-class/2011-mercedes-benz-cl-class/, Feb. 28, 2013, 5 pgs.
LEXUS, "The all-new LEXUS 2013", lexus.com P2-332, Feb. 2012, 13 pgs.
Mercedes-Benz, "Interior comfort—spoilt for choice", http://www.zungfu.com/pc_E_saloon.comfort.1.shtml, Feb. 28, 2013, 3 pgs.
Rostra Precision Controls Inc., "Universal Lumbar Installation Instructions", http://www.rostra.com/manuals/form3132F.pdf, Nov. 2, 2007, 8 pgs.
"Seats", http://www.bavarianmw.com/guide-4400.html, www.bmwmanuals.org, 2012, 5 pgs.
Mercedes-Benz, "Seat belts and airbags", http://www.mbusa.com/vcm/MB/DigitalAssets/pdfmb/serviceandparts/seatbelts_airbags.pdf, Oct. 27, 2005, 11 pgs.
SAE International, "Capacitive Sensors Increase Safety, Comfort", http://sae.org/automag/technewsletter/071106Electronics/04.htm, Jun. 13, 2013, 3 pages.
General Motors LLC, "2013 Chevrolet Spark Owner Manual," copyright 2012, 356 pages.
Matthew W Ing, United States Patent and Trademark Office, Non Final Office Communication re U.S. Appl. No. 13/749,561, dated Oct. 16, 2015, 33 pages.
Richard A Lowry, United States Patent and Trademark Office, Non Final Office Communication re U.S. Appl. No. 13/748,847, dated Sep. 10, 2014, 14 pages.
David E Allred, United States Patent and Trademark Office, Non Final Office Communication re U.S. Appl. No. 13/748,857, dated Aug. 25, 2014, 13 pages.
Timothy J Brindley, United States Patent and Trademark Office, Final Office Communication re U.S. Appl. No. 13/749,568, dated Mar. 26, 2015, 9 pages.
Timothy J Brindley, United States Patent and Trademark Office, Non Final Office Communication re U.S. Appl. No. 13/749,568, dated Sep. 8, 2014, 9 pages.
Milton Nelson Jr., United States Patent and Trademark Office, Final Office Communication re U.S. Appl. No. 13/749,572, dated Mar. 3, 2015, 13 pages.
Milton Nelson Jr., United States Patent and Trademark Office, Non Final Office Communication re U.S. Appl. No. 13/749,572, dated Sep. 30, 2014, 20 pages.
Nicole T Verley, United States Patent and Trademark Office, Non Final Office Communication re U.S. Appl. No. 13/749,589, dated Oct. 4, 2013, 12 pages.
Timothy J Brindley, United States Patent and Trademark Office, Non Final Office Communication re U.S. Appl. No. 13/749,595, dated Aug. 28, 2014, 10 pages.
Timothy J Brindley, United States Patent and Trademark Office, Final Office Communication re U.S. Appl. No. 13/749,595, dated Jan. 12, 2015, 10 pages.
Timothy J Brindley, United States Patent and Trademark Office, Non Final Office Communication re U.S. Appl. No. 13/749,584, dated Sep. 15, 2014, 9 pages.
Yolanda G Giacoman, United States Patent and Trademark Office, Final Office Communication re U.S. Appl. No. 13/748,862, dated Dec. 30, 2015, 10 pages.
Yolanda G Giacoman, United States Patent and Trademark Office, Non Final Office Communication re U.S. Appl. No. 13/748,862, dated Aug. 13, 2015, 9 pages.
Yolanda G Giacoman, United States Patent and Trademark Office, Final Office Communication re U.S. Appl. No. 13/748,862, dated Mar. 10, 2015, 19 pages.
Yolanda G Giacoman, United States Patent and Trademark Office, Non Final Office Communication re U.S. Appl. No. 13/748,862, dated Sep. 25, 2014, 16 pages.
Milton Nelson Jr., United States Patent and Trademark Office, Non Final Office Communication re U.S. Appl. No. 13/749,602, dated Sep. 19, 2014, 9 pages.
Melissa Ann Black, United States Patent and Trademark Office, Non Final Office Communication re U.S. Appl. No. 13/914,666, dated Mar. 13, 2015, 6 pages.

(56) References Cited

OTHER PUBLICATIONS

Philip F Gabler, United States Patent and Trademark Office, Non Final Office Communication re U.S. Appl. No. 14/025,483, dated Dec. 17, 2014, 8 pages.

Philip F Gabler, United States Patent and Trademark Office, Final Office Communication re U.S. Appl. No. 14/025,483, dated Apr. 23, 2015, 10 pages.

Philip F Gabler, United States Patent and Trademark Office, Non Final Office Communication re U.S. Appl. No. 14/025,483, dated Aug. 18, 2015, 14 pages.

Philip F Gabler, United States Patent and Trademark Office, Final Office Communication re U.S. Appl. No. 14/025,483, dated Dec. 18, 2015, 14 pages.

Peter R Brown, United States Patent and Trademark Office, Final Office Communication re U.S. Appl. No. 14/104,780, dated Dec. 1, 2015, 5 pages.

Peter R Brown, United States Patent and Trademark Office, Non Final Office Communication re U.S. Appl. No. 14/104,780, dated Jun. 29, 2015, 9 pages.

Nicole T Verley, United States Patent and Trademark Office, Advisory Action for U.S. Appl. No. 14/056,005, dated Sep. 30, 2015, 3 pages.

Nicole T Verley, United States Patent and Trademark Office, Final Office Communication re U.S. Appl. No. 14/056,005, dated Jun. 10, 2015, 8 pages.

Nicole T Verley, United States Patent and Trademark Office, Non Final Office Communication re U.S. Appl. No. 14/056,005, dated Mar. 2, 2015, 8 pages.

Peter R Brown, United States Patent and Trademark Office, Non Final Office Communication re U.S. Appl. No. 14/056,000, dated Mar. 4, 2015, 7 pages.

Peter R Brown, United States Patent and Trademark Office, Non Final Office Communication re U.S. Appl. No. 14/056,000, dated Oct. 1, 2014, 8 pages.

Philip F Gabler, United States Patent and Trademark Office, Final Office Communication re U.S. Appl. No. 14/076,893, dated Sep. 29, 2015, 13 pages.

Philip F Gabler, United States Patent and Trademark Office, Non Final Office Communication re U.S. Appl. No. 14/076,893, dated Apr. 21, 2015, 12 pages.

David E Allred, United States Patent and Trademark Office, Non Final Office Communication re U.S. Appl. No. 14/063,647, dated Aug. 18, 2015, 19 pages.

Matthew W Ing, United States Patent and Trademark Office, Non Final Office Communication re U.S. Appl. No. 14/609,092, dated Oct. 19, 2015, 11 pages.

Alexander Scott Harrison, United States Patent and Trademark Office, Final Office Communication re U.S. Appl. No. 14/243,027, dated Jan. 20, 2016, 17 pages.

Alexander Scott Harrison, United States Patent and Trademark Office, Non Final Office Communication re U.S. Appl. No. 14/243,027, dated Aug. 13, 2015, 15 pages.

Ryan D Kwiecinski, United States Patent and Trademark Office, Non Final Office Communication re U.S. Appl. No. 14/230,961, dated Dec. 24, 2015, 12 pages.

Philip F Gabler, United States Patent and Trademark Office, Final Office Communication re U.S. Appl. No. 14/257,655, dated Dec. 18, 2015, 10 pages.

Philip F Gabler, United States Patent and Trademark Office, Non Final Office Communication re U.S. Appl. No. 14/257,655, dated Aug. 20, 2015, 10 pages.

Syed A Islam, United States Patent and Trademark Office, Final Office Communication re U.S. Appl. No. 14/275,368, dated Nov. 13, 2015, 13 pages.

Syed A Islam, United States Patent and Trademark Office, Non Final Office Communication re U.S. Appl. No. 14/275,368, dated May 6, 2015, 10 pages.

Laurie K Cranmer, United States Patent and Trademark Office, Non Final Office Communication re U.S. Appl. No. 14/505,675, dated Aug. 31, 2015, 7 pages.

Rodney Barnett White, United States Patent and Trademark Office, Non Final Office Communication re U.S. Appl. No. 14/600,166, dated Nov. 2, 2015, 7 pages.

Rodney Barnett White, United States Patent and Trademark Office, Final Office Communication re U.S. Appl. No. 14/534,296, dated Dec. 11, 2105, 14 pages.

Rodney Barnett White, United States Patent and Trademark Office, Non Final Office Communication re U.S. Appl. No. 14/534,296, dated Aug. 26, 2015, 13 pages.

Sanjeev Malhotra, United States Patent and Trademark Office, Non Final Office Communication re U.S. Appl. No. 14/534,285, dated Sep. 23, 2015, 14 pages.

Nicole T Verley, United States Patent and Trademark Office, Non Final Office Communication re U.S. Appl. No. 14/635,025, dated Dec. 4, 2015, 8 pages.

\* cited by examiner

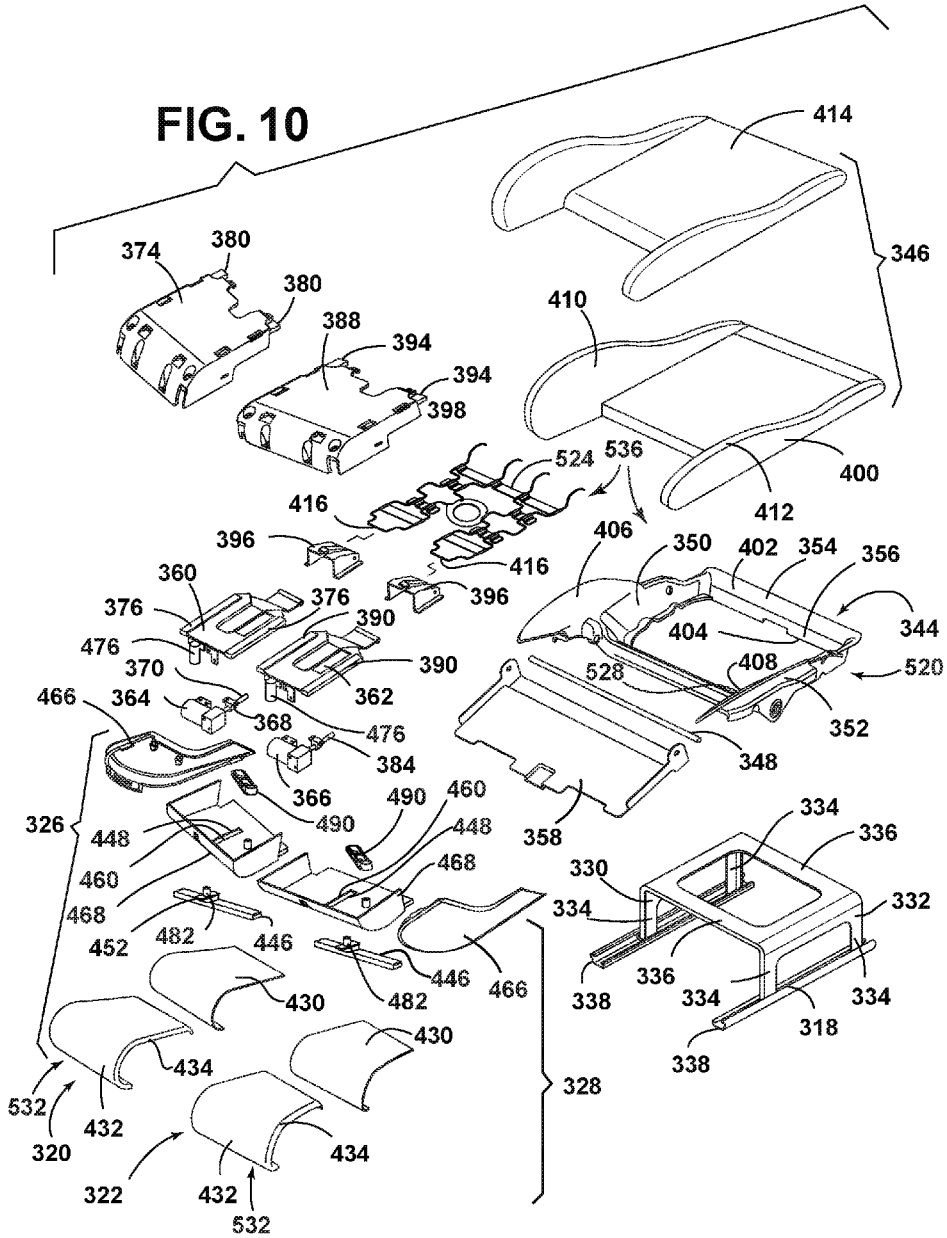

DUAL SUSPENSION SEATING ASSEMBLY

CROSS-REFERENCE TO RELATED APPLICATIONS

This application is a continuation-in-part of U.S. patent application Ser. No. 15/071,947, filed Mar. 16, 2016, and entitled "COMPOSITE SEAT STRUCTURE," now U.S. Pat. No. 9,849,817 and also U.S. patent application Ser. No. 15/096,364, filed Apr. 12, 2016, and entitled "ARTICULATING MECHANICAL THIGH EXTENSION COMPOSITE TRIM PAYOUT LINKAGE SYSTEM," now U.S. Pat. No. 10,046,681. The aforementioned related applications are hereby incorporated by reference in their entirety.

FIELD OF THE DISCLOSURE

The present disclosure generally relates to a seating assembly. More specifically, the present disclosure relates to a vehicle seating assembly.

BACKGROUND

Modern vehicle seats are becoming more and more comfortable as a further understanding of human ergonomics, posture, and comfortability is studied. Vehicle seating assemblies that include comfort components in the vehicle seatback and the vehicle seat can provide the driver and passengers with improved comfort and increased endurance for extensive vehicle rides. Additionally, safety concerns for passengers during collision events are considered in vehicle seat design. Accordingly, vehicle seating assemblies that include components to accommodate the different sizes and shapes of drivers and passengers, as well as maintain safety of drivers and passengers, have become increasingly important.

SUMMARY

According to a first aspect of the present disclosure, a vehicle seating assembly includes a seatback and a seat base. The seat base is operably coupled to the seatback. The seat base includes a first suspension assembly. The first suspension assembly includes a suspension member that is operably coupled to a seat pan, one or more tunable springs positioned across the seat pan, flexible side bolsters of the seat pan, a seat cushion assembly positioned above the suspension member, and articulated seat side bolsters of the seat cushion assembly. The seat base further includes a second suspension assembly. The second suspension assembly includes a plurality of independent thigh supports operably coupled to a forward portion of the seat pan.

Embodiments of the first aspect of the present disclosure can include any one or a combination of the following features:
  the plurality of independent thigh supports are independently operable between an extended position and a retracted position;
  the plurality of independent thigh supports are actuated between the extended and retracted positions by a first motor and a second motor operably coupled to first and second thigh supports of the plurality of independent thigh supports, respectively;
  the plurality of independent thigh supports are independently operable between a raised position and a lowered position;
  the plurality of independent thigh supports further include a support base attached to the forward portion of the seat pan, a movable housing slidably coupled to the support base, and a trim cover stock partially positioned above an upper surface of the movable housing;
  the plurality of independent thigh supports further include a linkage system configured to articulate the independent thigh supports between extended and retracted positions; and
  the linkage system further includes a first fixed pivot positioned within a cavity of the movable housing and operably coupled to a first end of a pivot bracket, a second displaceable pivot mounted to an upper portion of a trim payout slider and positioned within a first slot of the pivot bracket, and a third fixed pivot mounted to an interior surface of a lower clamshell of the movable housing and positioned in a second slot of the pivot bracket.

According to a second aspect of the present disclosure, a vehicle seating assembly includes a seatback and a seat base. The seat base is operably coupled to the seatback. The seat base includes a dual suspension system. The dual suspension system includes a first suspension assembly. The first suspension assembly supports a posterior of an occupant of the seat base. The dual suspension system further includes a second suspension assembly. The second suspension assembly includes independent thigh supports. The first and second suspension assemblies are independent of one another.

Embodiments of the second aspect of the present disclosure can include any one or a combination of the following features:
  the first suspension assembly further includes a seat pan assembly and a seat cushion assembly positioned above the seat pan assembly;
  the seat pan assembly further includes flexible side bolsters of a seat pan;
  the seat pan assembly further includes a suspension member operably coupled to the seat pan;
  the seat pan assembly further includes one or more tunable springs positioned across the seat pan; and
  the seat cushion assembly further includes articulated seat side bolsters.

According to a third aspect of the present disclosure, a vehicle seating assembly includes a seatback and a seat base. The seat base is operably coupled to the seatback. The seat base includes a first suspension assembly. The first suspension assembly includes a seat pan assembly and a seat cushion assembly positioned above the seat pan assembly. The seat base further includes a second suspension assembly. The second suspension assembly includes a plurality of independent thigh supports operably coupled to a forward portion of the seat pan.

Embodiments of the third aspect of the present disclosure can include any one or a combination of the following features:
  the seat pan assembly further includes flexible side bolsters of a seat pan;
  the seat pan assembly further includes a suspension member operably coupled to a seat pan;
  the seat pan assembly further includes one or more tunable springs positioned across a seat pan;
  the seat cushion assembly further includes articulated seat side bolsters;
  the plurality of independent thigh supports are independently operable between an extended position and a retracted position; and the plurality of independent thigh supports are independently operably between a raised position and a lowered position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 10 is a perspective exploded view of the lower seat of the vehicle seating assembly of FIG. 7;

DETAILED DESCRIPTION

Figure 1:
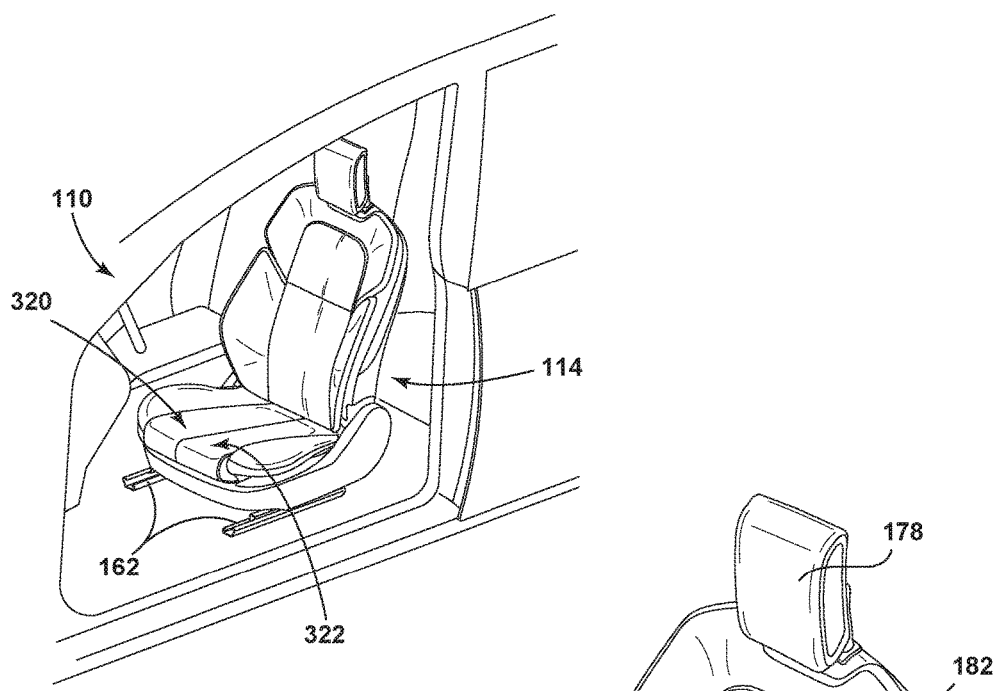
FIG. 1 is a top perspective view of a vehicle seating assembly of the present disclosure disposed in a vehicle.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the examples illustrated in FIGS. 1-5, reference numeral 110 generally designates a vehicle which includes a seating assembly 114. The seating assembly 114 includes a seatback 118 and a seat base 122 operably connected to the seatback 118. The seat base 122 includes a seat base frame 126 having a rear tube 130 extending laterally between at least two side members 134. The seat base 122 further includes a seat cushion assembly 138 and a seat pan 142. The seat pan 142 is positioned between the seat cushion assembly 138 and the seat base frame 126. The seat pan 142 has a plurality of recessed features 146 configured to couple over the rear tube 130 and side members 134. The seat pan 142 integrally defines a flexible cross bar 150 extending laterally between the recessed features 146. A plurality of hooks 154 may be integrally defined by the seat pan 142 and may operably couple the seat pan 142 to the seat cushion assembly 138.

Figure 2:
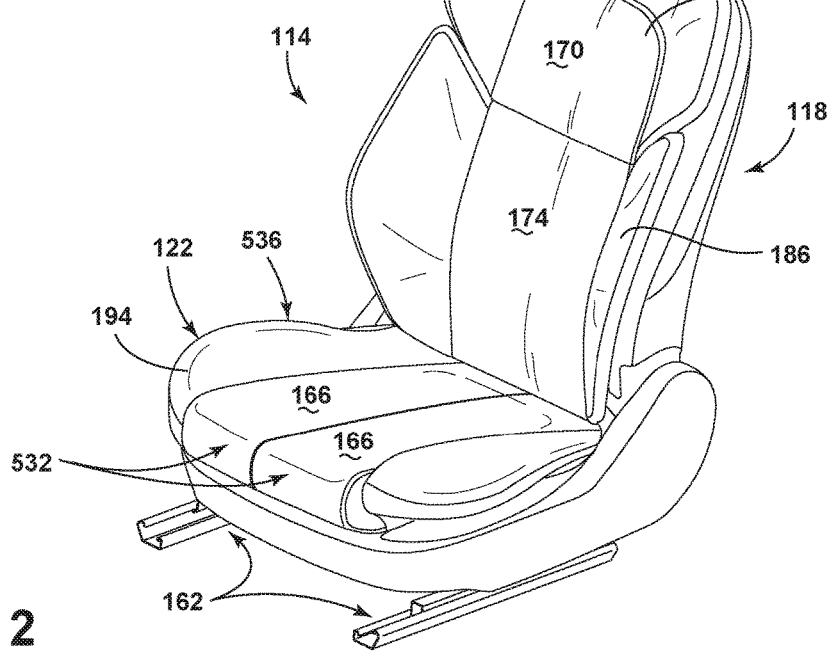
FIG. 2 is an enlarged top perspective view of the vehicle seating assembly of FIG. 1.
Figure 3:
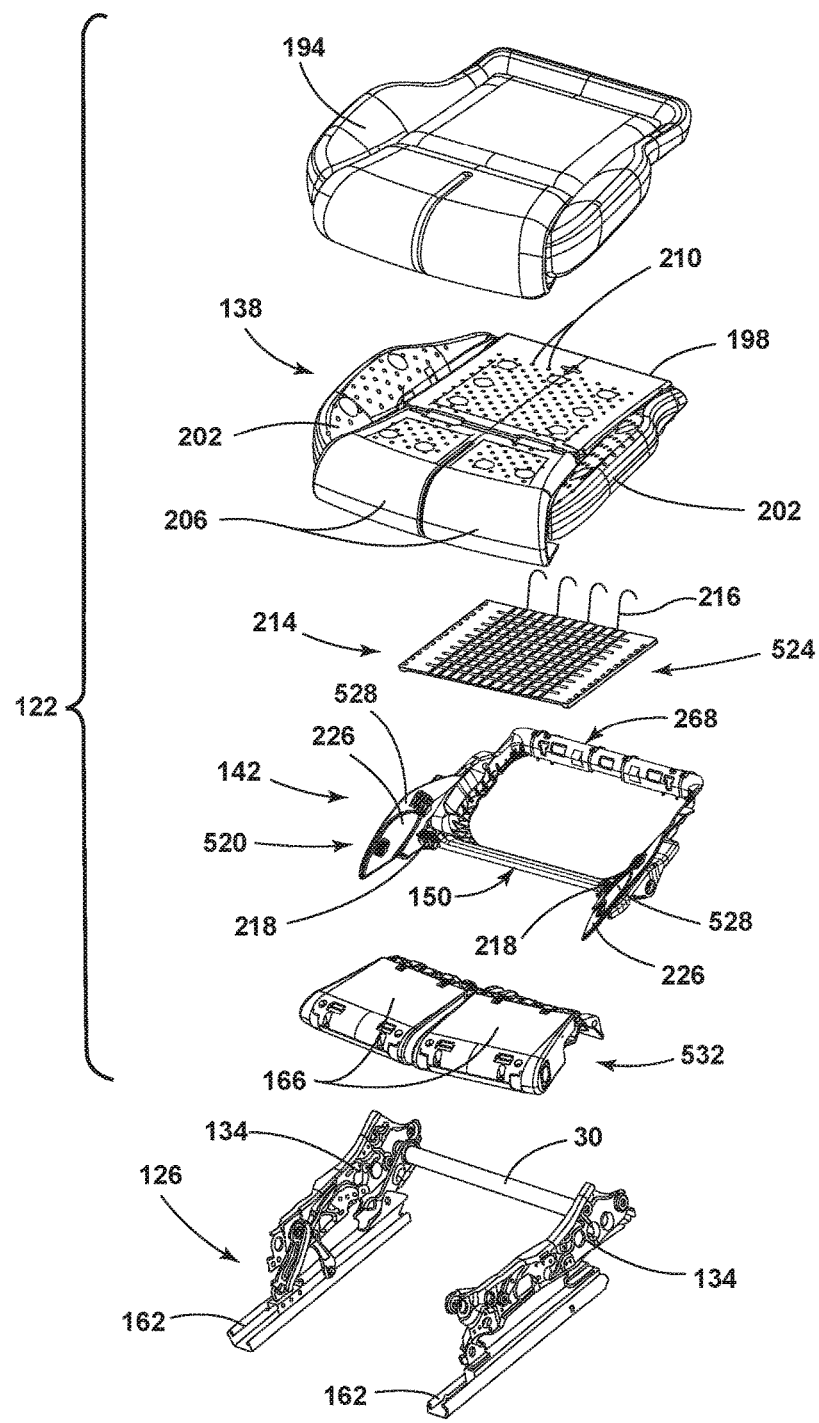
FIG. 3 is a top perspective partial exploded view of a seat of the vehicle seating assembly of the present disclosure.

Referring now to FIGS. 1-3, the illustrated vehicle seating assembly 114 is configured for use in a vehicle of any type, including, without limitation, cars, vans, trucks, buses, etc. The vehicle seating assembly 114 is suspended on rails 162 that allow movement of the vehicle seating assembly 114 in fore and aft directions within the vehicle 110. In addition, the vehicle seating assembly 114 may include a variety of comfort controls, including, for example, thigh support using independent thigh supports 166, lumbar support, and upper thoracic support. The seatback 118 includes both an upper seatback 170 and a lower seatback 174. The vehicle seating assembly 114 includes a head restraint 178 that is disposed on the upper seatback 170. The head restraint 178 is moveable between forward and rearward positions to accommodate various sized heads of passengers, as well as different heights of passengers. The vehicle seating assembly 114 also includes controls specifically configured to adjust an upper thoracic portion 182 of the upper seatback 170 or a lower thoracic portion 186 of the lower seatback 174.

The seat base 122 includes the seat pan 142 that is operably coupled with the seat base frame 126 and which is configured to support the seat cushion assembly 138 and a cover stock 194 disposed thereon. The seat pan 142 is positioned between the seat base frame 126 and the seat cushion assembly 138. A climate control system may be provided, which can draw air from, or blow air through, the seat cushion assembly 138 and cover stock 194. The seat cushion assembly 138 includes a main cushion 198, seat side bolsters 202, and forward thigh support cushions 206. The thigh support cushions 206 are configured to wrap over the thigh supports 166 to provide comfort while supporting the passenger's thighs. The main cushion 198 and/or seat side bolsters 202 may include a plurality of ventilation holes 210 configured to allow air to pass through the seat base 122. Disposed between the seat pan 142 and the seat cushion assembly 138 is a suspension member 214 configured to provide support to a passenger in the seating assembly 114. The suspension member 214 includes a plurality of suspension hooks 216 positioned at a rear of the suspension member 214.

With further reference to FIG. 3, the vehicle seating assembly 114 includes the seat base 122. The seatback 118 (FIG. 2) is operably coupled to a rear of the seat base 122. Each of the first and second independently moveable thigh supports 166 are independently laterally translatable forward and rearward relative to the seat base 122. A spring assembly may be used to urge each thigh support 166 to a fully forward lateral position. Each of the first and second independently moveable thigh supports 166 are rotatable relative to the seat base 122. The thigh supports 166 may be coupled to the seat pan 142 at thigh attachment points 218 positioned on a vehicle forward location of the seat pan 142. The thigh attachment points 218 may be integrally defined by the seat pan 142 or may be coupled thereto. As noted above, the thigh supports 166 are configured to rotate upward and downward relative to the seat base 122 between raised and lowered positions, and are also configured to translate laterally between extended and retracted positions relative to the seat base 122. The moveable thigh supports 166 are independent such that one thigh support 166 may be at the raised position, while the other thigh support 166 may be at the lowered position, or at any position in between the raised and lowered positions.

Figure 4A:
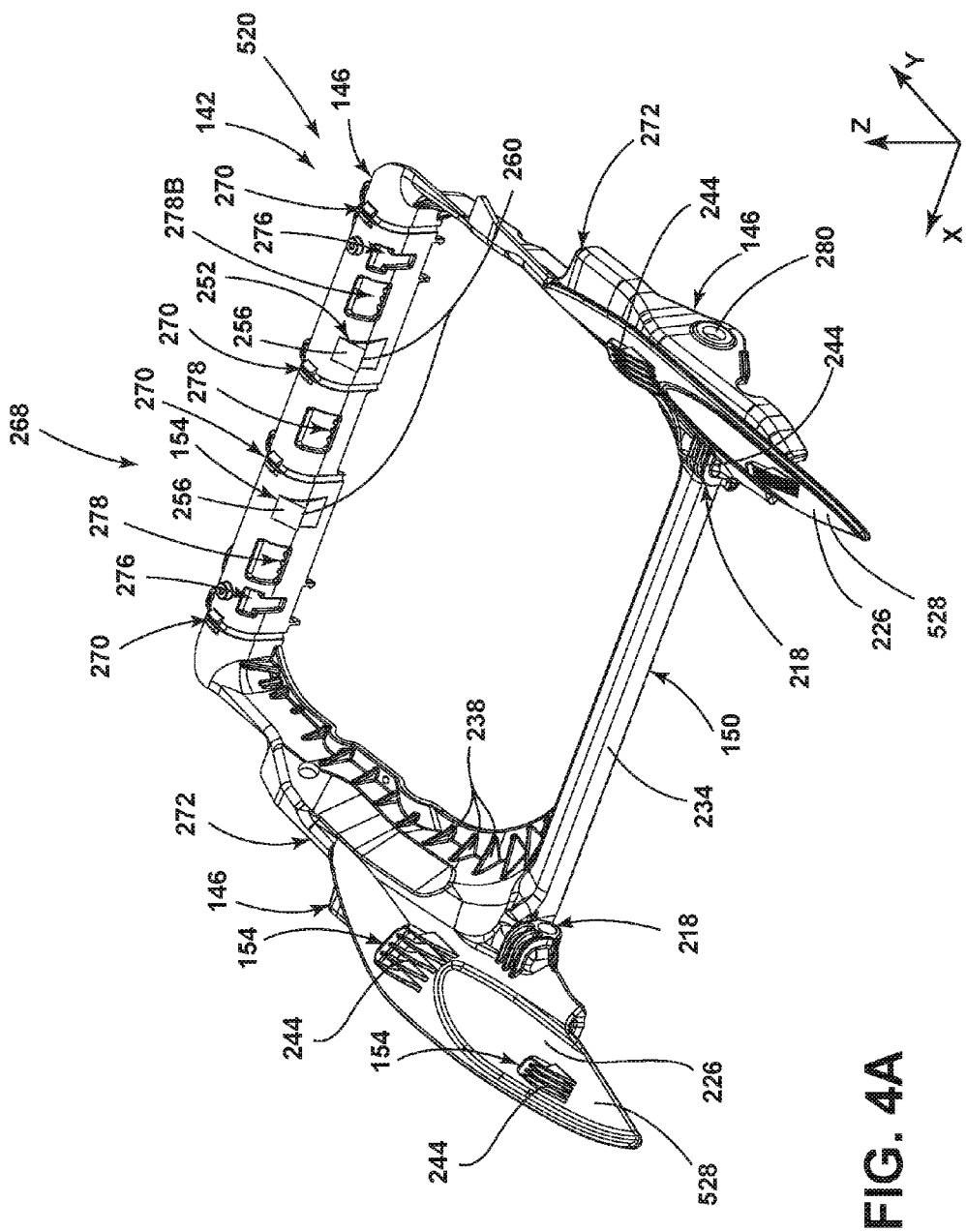
FIG. 4A is a top perspective view of a seat pan of the present disclosure.
Figure 4B:
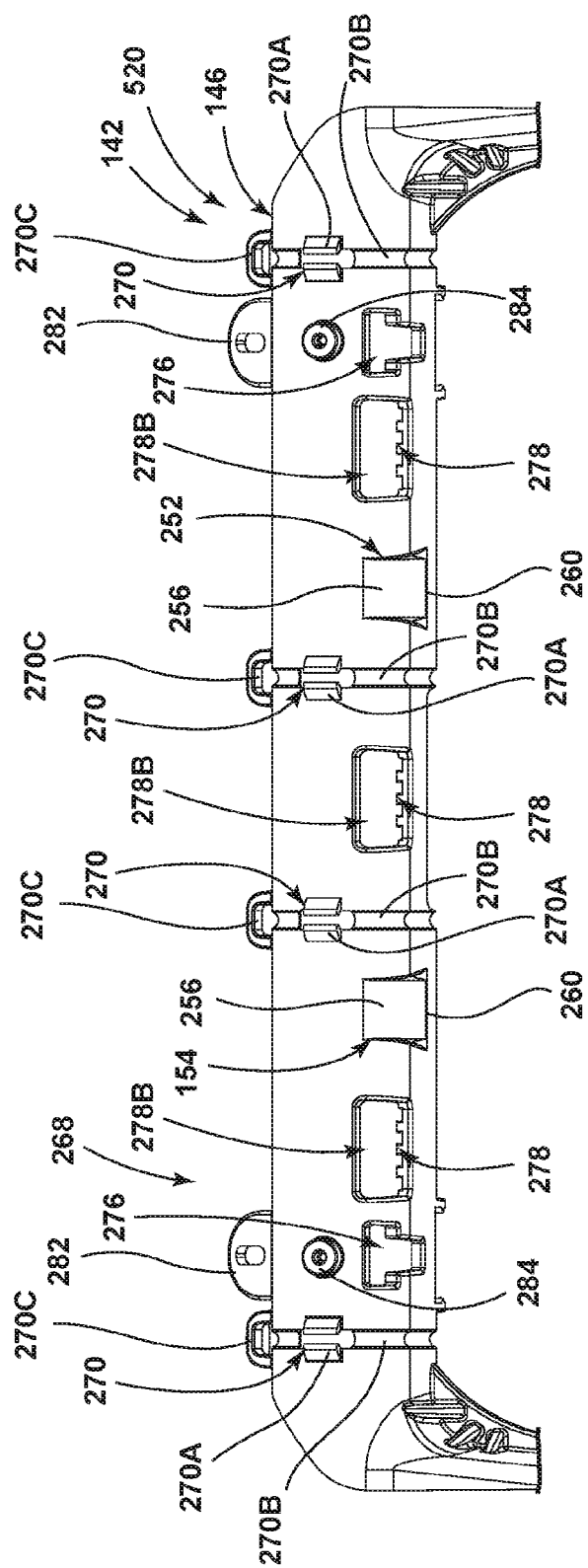
FIG. 4B is an enhanced top view of the seat pan of the present disclosure.
Figure 4C:
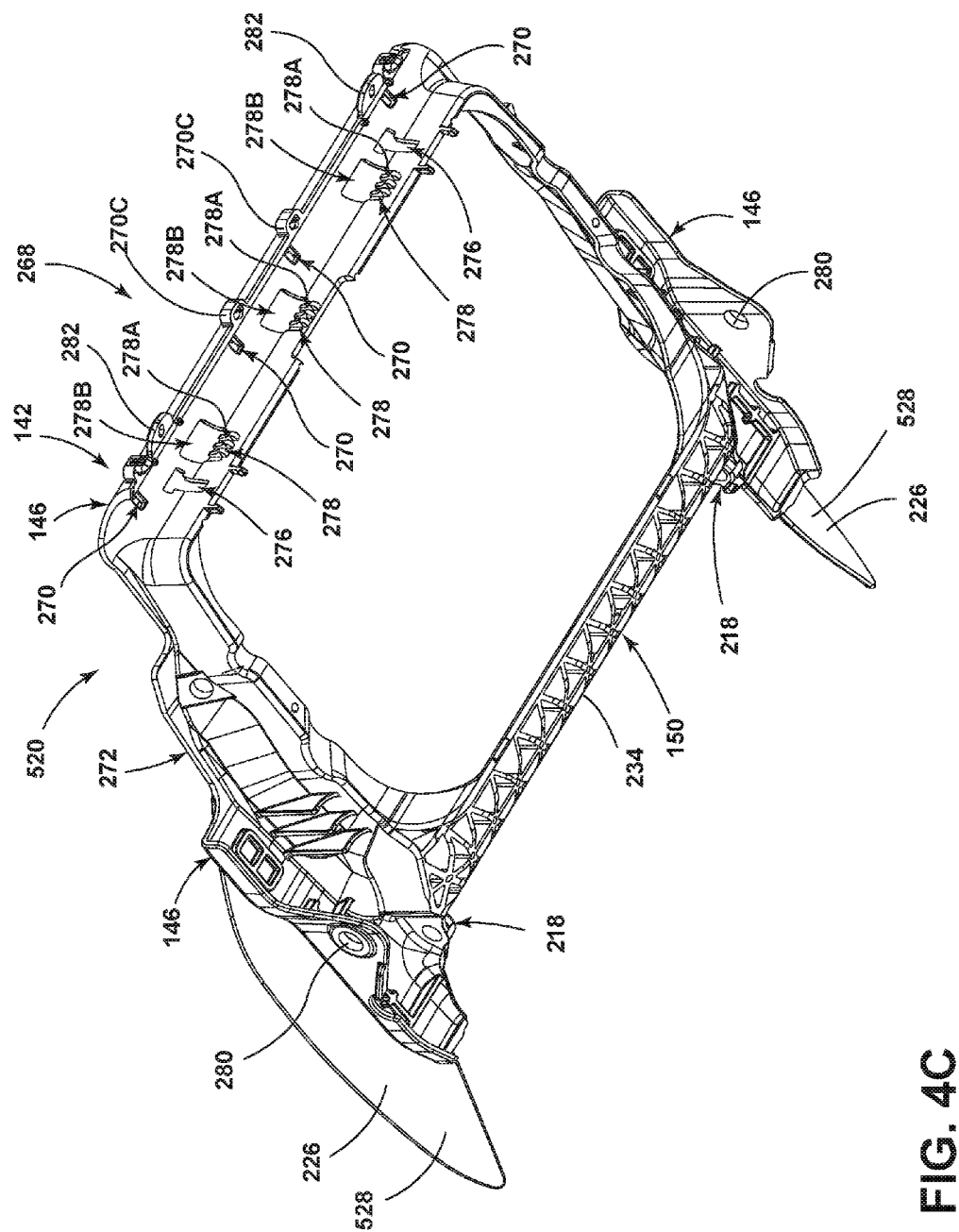
FIG. 4C is a bottom perspective view of the seat pan of the present disclosure.
Figure 5:
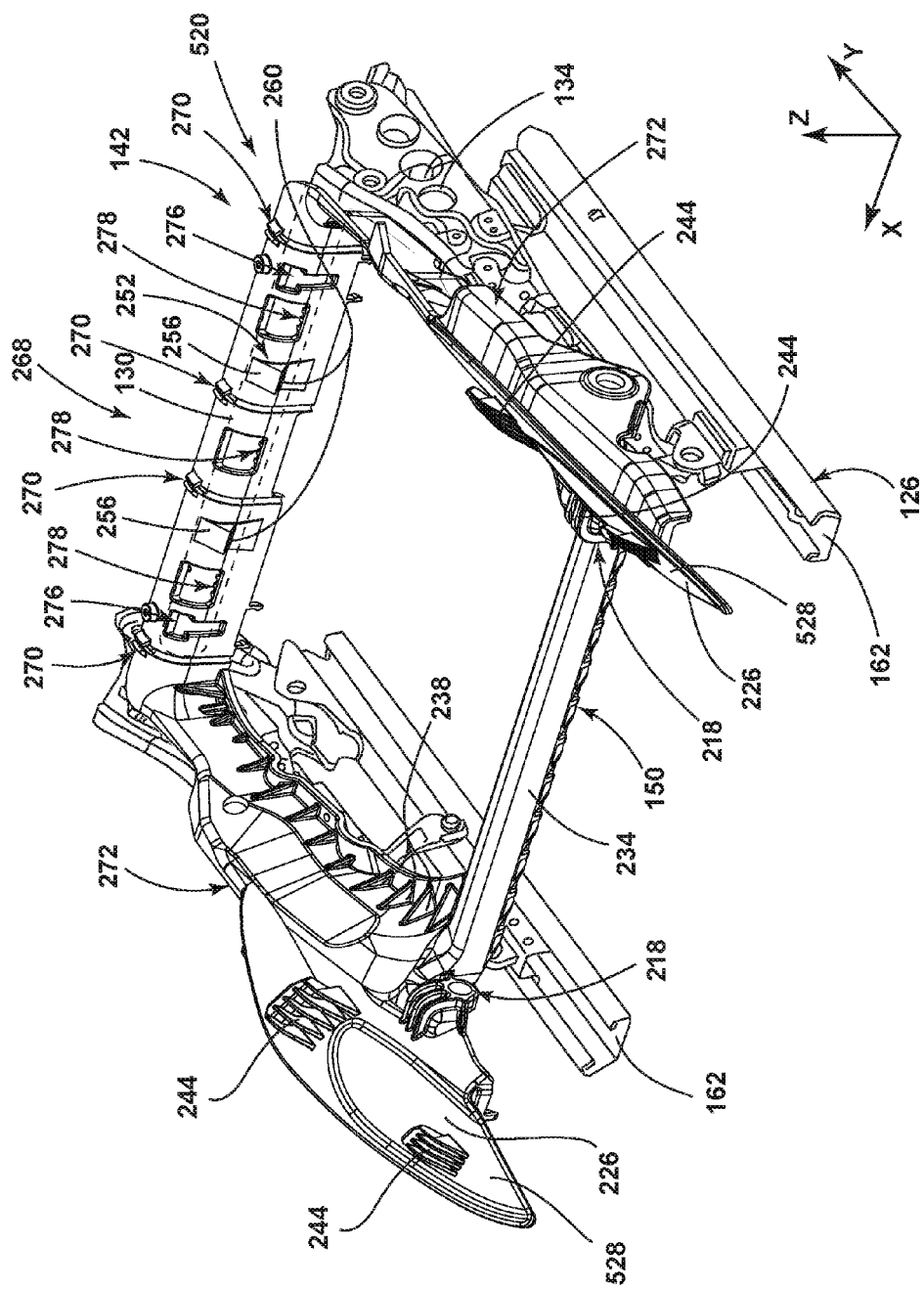
FIG. 5 is a top perspective view of the seat pan of FIG. 4A coupled with a seat frame of the present disclosure.

Referring now to FIG. 4A, the seat pan 142 may be formed of a metal, plastic, or composite material. In composite material examples of the seat pan 142, the seat pan 142 may be formed of a fiber filler and resin combination. The fiber filler volume fraction within the resin may be between about 1% and about 60%, or between about 15% and about 40%, or between about 30% and about 40%. In a specific example, the fiber filler volume fraction within the seat pan 142 may be about 35%. The fibers may be composed of materials including carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. The fibers may be continuous or chopped to a particular length. The length of the chopped fibers can be between about 1 mm and about 20 mm, or between about 3 mm and about 11 mm, or between about 5 mm and about 7 mm. Typically, the fibers are randomly oriented in the resins within the seat pan 142. However, the fibers may also be substantially aligned directionally in areas of the seat pan 142 subject to high directional stresses or areas of anticipated stress (e.g., connections or transitions between parts of the seat pan 142). The seat pan 142 may incorporate one or more preformed fiber mats which may include woven or non-woven fibers that are held together using the same or different resins as employed in the seat pan 142. The resin employed in the seat pan 142 may include a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole, or combinations thereof. The use of a composite material such as a fiber filled resin may allow the seat pan 142 to be formed via injection molding, thermoforming, and other processes for forming a polymeric member. The use of a fiber composite material for the seat pan 142 may allow for increased durability and fatigue loading of the seat pan 142.

In the depicted example, the seat pan 142 includes side bolsters 226. The side bolsters 226 may be integrally formed with the seat pan 142 or may be attached thereto. The side bolsters 226 are configured to support and flex under stress to provide resiliency to the seat side bolsters 202 (FIG. 3). Additionally, integrally forming the side bolsters 226 with the seat pan 142 increases the structural support for the passenger during ingress/egress from the seating assembly 114, as well as during jounce and abuse loading circumstances. The side bolsters 226 are configured to deflect or flex in an X-direction, a Y-direction, and/or a Z-direction. The side bolsters 226 may deflect greater than about 10 mm, 20 mm, 30 mm, 40 mm, 50 mm, 60 mm, 70 mm, 80 mm, 90 mm, or greater than about 100 mm in any or all of the X-, Y-, or Z-directions without breaking or breakage during a stress or loading event (e.g., front end collision of the vehicle 110 or movement of a passenger within the seating assembly 114 of FIG. 1). Extending across the seat pan 142 and between the recessed features 146 is the cross bar 150. The cross bar 150 may include a wall 234 and a plurality of ribs 238. The plurality of ribs 238 extend in a direction perpendicular to that of the wall 234. The positioning of the ribs 238 along the wall 234 provides a stress relief design for the cross bar 150 such that it may flex or deflect. The cross bar 150 may take a variety of cross-sectional shapes including square, rectangular, circular, ellipsoid, or other shapes configured to define the wall 234. The cross bar 150 is configured to deflect or flex in the X-direction, the Y-direction, and the Z-direction. The cross bar 150 may deflect greater than about 10 mm, 20 mm, 30 mm, 40 mm, 50 mm, 60 mm, 70 mm, 80 mm, 90 mm, or greater than about 100 mm, in any or all of the X-, Y-, or Z-directions without breaking or breakage during a stress or loading event (e.g., a front end collision) under temperature conditions as high as 70° C. and humidity as high as 60%. In some examples, the temperature and/or humidity of the environment surrounding the seat pan 142 may affect (e.g., increase) the deflection amount of the cross bar 150. By configuring the cross bar 150 to be flexible, it allows the cross bar 150 to deflect during an impact or sudden deceleration event for the vehicle 110. During forward impact or sudden deceleration of the vehicle 110, a passenger of the seating assembly 114 may be forced into the seat base 122 (FIG. 1) due to continued forward motion of the passenger relative to the seating assembly 114. Movement of the passenger into the seat base 122 may cause submarining, or movement of the passenger below a safety belt of the seating assembly, to occur. By configuring the cross bar 150 to flex and deflect under stress, but not break, a passenger of the seating assembly 114 may be decelerated safely such that submarining is minimized or eliminated.

As explained above, the seat pan 142 defines a plurality of hooks 154 disposed about the seat pan 142. In the depicted example, each of the side bolsters 226 integrally define a pair of rearward hooks 244. In other examples, the rearward hooks 244 may be otherwise joined to the side bolsters 226. The rearward hooks 244 are configured to face in a vehicle rearward direction and are configured to engage the seat cushion assembly 138 of FIG. 3 and retain it against the seat pan 142. The seat cushion assembly 138 may define a plurality of recesses or retention features on an underside of the main cushion 198 and seat side bolsters 202 configured to engage and retain the rearward hooks 244. Additionally, the rearward facing nature of the rearward hooks 244 resists the motion of the seat cushion assembly 138 in a vehicle forward direction during an impact or sudden deceleration event. In some examples, the rearward hooks 244 may include a snap feature such that the seat cushion assembly 138 is locked to the seat pan 142. In addition to the rearward hooks 244, the plurality of hooks 154 also include at least one downward hook 252. In the depicted example, the seat pan 142 integrally defines two downward hooks 252. The downward hooks 252 include an angled surface 256 and a retention lip 260. The downward hooks 252 are configured to retain the seat cushion assembly 138 downward against the seat pan 142. During an exemplary assembly method of the seat cushion assembly 138 to the seat pan 142, the seat cushion assembly 138 is engaged (e.g., snapped) to the rearward hooks 244 by applying vehicle forward motion to the seat cushion assembly 138. Once the seat cushion assembly 138 is attached to the rearward hooks 244, the rear of the seat cushion assembly 138 is forced downward under the downward hooks 252. During the downward motion of the seat cushion assembly 138, the seat cushion assembly 138 contacts and slides along the angled surface 256. The seat cushion assembly 138 is then slid under the retention lip 260. The retention lip 260 extends over the seat cushion assembly 138 such that the seat cushion assembly 138 is rotationally and vertically locked under the downward hooks 252.

Referring now to FIGS. 4A-4C and 5, in addition to the plurality of hooks 154 and the cross bar 150, the seat pan 142 additionally defines the plurality of recessed features 146. The plurality of recessed features 146 include a rear recessed feature 268 and side recessed features 272. The rear recessed feature 268 extends the width of the seat pan 142 and has a generally curved structure. The curved structure of the rear recessed feature 268 is configured to couple with the rear tube 130 of the seat base frame 126. The rear recessed feature 268 is configured to partially surround, or nest, over the rear tube 130 such that the rear tube 130 supports the seat pan 142 through the rear recessed feature 268. The rear tube 130 may be any lateral cross member that is hollow or solid, and may take a variety of cross-sectional shapes including rectangular, square, circular, ellipsoid or others configured to provide structural rigidity to the seat base frame 126. In examples where the rear tube 130 is a shape other than circular, the rear recessed feature 268 may be complimentarily shaped to couple or nest over the rear tube 130. As depicted, the downward hooks 252 are defined on the rear recessed feature 268. Additionally, the rear recessed feature 268 may define one or more attachment apertures 276 which may be utilized with a fastener for securing the rear recessed feature 268 to the rear tube 130. The rear recessed feature 268 defines a plurality of locking features 278. The locking features 278, in the depicted example, include a plurality of teeth. The locking features 278 protrude into the recessed portion of the rear recessed feature 268 and are configured to engage the rear tube 130 (FIG. 3). The locking features 278 define upwardly curved surfaces 278a configured to mate with the rear tube 130. The upwardly curved surfaces 278a extend partially under the rear tube 130, such that the rear tube 130 may be snap fit into the rear recessed feature 268 and the seat pan 142 is secured to the seat base frame 126. Additionally or alternatively, the locking features 278 may be used to help locate the seat pan 142 onto the correct location on the rear tube 130. Further, the rear recessed feature 268 defines a plurality of locking apertures 278B which may allow one or more fasteners to fasten the seat pan 142 to the rear tube 130. In another example, a portion of the rear tube 130 may extend through the locking apertures 278B.

Further, the rear recessed feature 268 may define one or more suspension attachment features 270. The suspension attachment features 270 include a suspension clip 270A, a suspension channel 270B, and a suspension retainer 270C. The suspension attachment features 270 are configured to engage the suspension hooks 216. The suspension clips 270A may be snap features, clips, hook and loop attachments or other features configured to grip the suspension hooks 216 to provide retention between the suspension member 214 and the seat pan 142. The suspension channels 270B are sized to accept the suspension hooks 216 to create a low profile appearance. The suspension hooks 216 wrap over the rear recessed feature 268 through the suspension channel 270B and suspension clips 270A, and engage the suspension retainers 270C. The suspension retainers 270C retain the ends of the suspension hooks 216 in place. Positioned proximate the suspension retainers 270C are retaining flanges 282. The retaining flanges 282 are configured to accept a fastener to further secure the seat pan 142 to the seat base frame 126 or other seating relating structures. Positioned on top of the rear recessed feature 268 may be a plurality of fasteners 284.

The side recessed features 272 are positioned proximate the side bolsters 226 along sides of the seat pan 142. The side recessed features 272 are shaped complimentary to that of the side members 134 and have sufficient width such that the side recessed features 272 may couple over, or nest on, the side members 134. The side recessed features 272 may define attachment points 280 through which a bolt or other fastener may be used to secure the seat pan 142 to the side members 134 of the seat base frame 126. Cooperation of the bolts or fasteners through the attachment points 280 and the attachment apertures 276 aid in securing the seat pan 142 to the seat base frame 126.

Use of the recessed features 146 may allow for easy assembly of the seat pan 142 to the seat base frame 126. In an exemplary assembly method, the seat pan 142 is positioned over the seat base frame 126 such that the recessed features 146 are aligned with the side members 134 and the rear tube 130. The seat pan 142 is then placed on the seat base frame 126 such that the recessed features 146 are nested on the side members 134 and the rear tube 130. Finally, fasteners may be secured through the attachment points 280 and the attachment apertures 276 to secure the seat pan 142 to the seat base frame 126.

Use of the present disclosure may offer several advantages. For example, use of the present disclosure may allow the seating assembly 114 to meet various testing standards including static strength, dynamic strength, vibration and durability/fatigue, dynamic pulses, safety crashes, passenger jounce as well as ingress/egress, squeak/rattle, abuse loading, thigh support, life cycle and others. Additionally, use of the present disclosure may increase the modularity of the seating assembly 114 which may decrease costs associated with shipping, overhead, and assembly while correspondingly increasing the customization of the seating assembly 114. Further, the present disclosure may offer a weight neutral or weight savings alternative as compared to traditional seating assemblies while increasing structural performance. Finally, use of the composite seat pan 142 structure allows for the integral molding of connection and attachment points for electrical, mechanical and/or pneumatic systems which may save on assembly time, cost, packaging space, and weight, as well as manufacturing cost.

Turning now to FIGS. 6-15C, additional or alternative features and concepts of the present disclosure are depicted. It will be understood by one of ordinary skill in the art that the features depicted and discussed in FIGS. 1-5 can be similar or identical to the features depicted and discussed below for FIGS. 6-15C.

Figure 6:
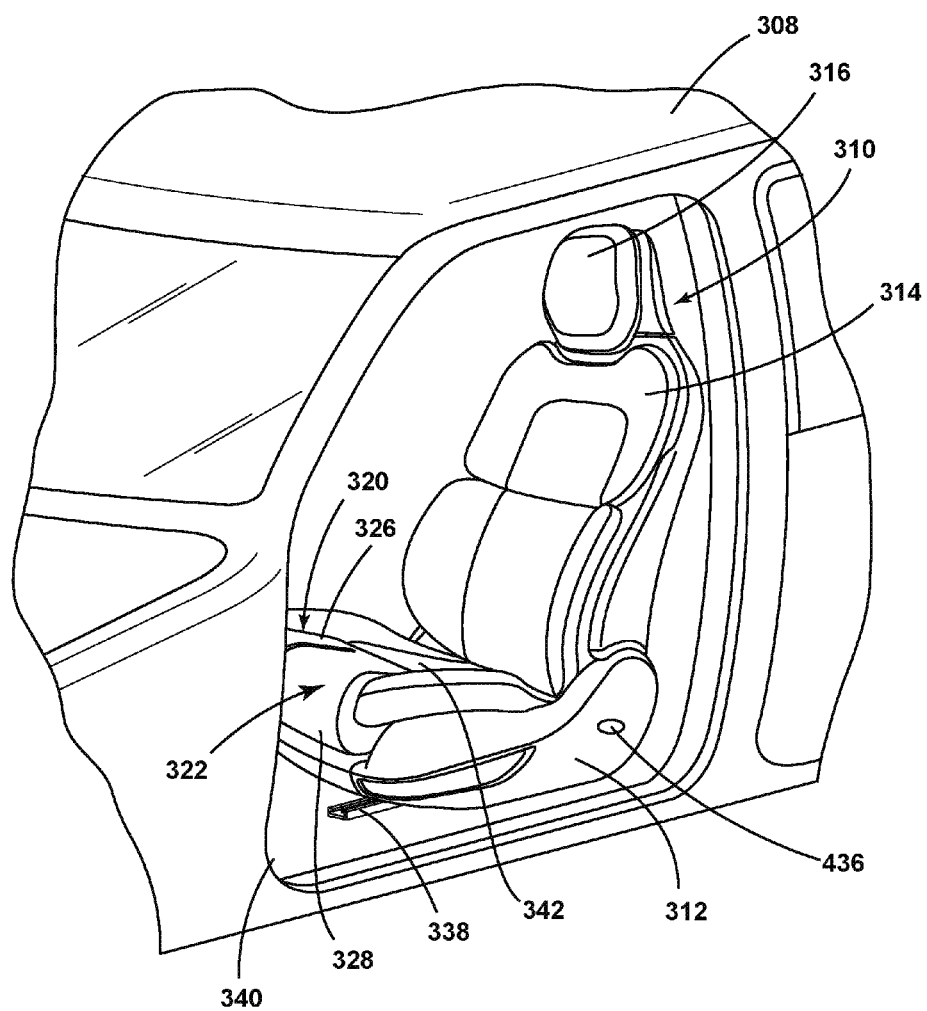
FIG. 6 is a perspective view of one embodiment of a vehicle seating assembly of the present invention disposed in a vehicle.
Figure 7:
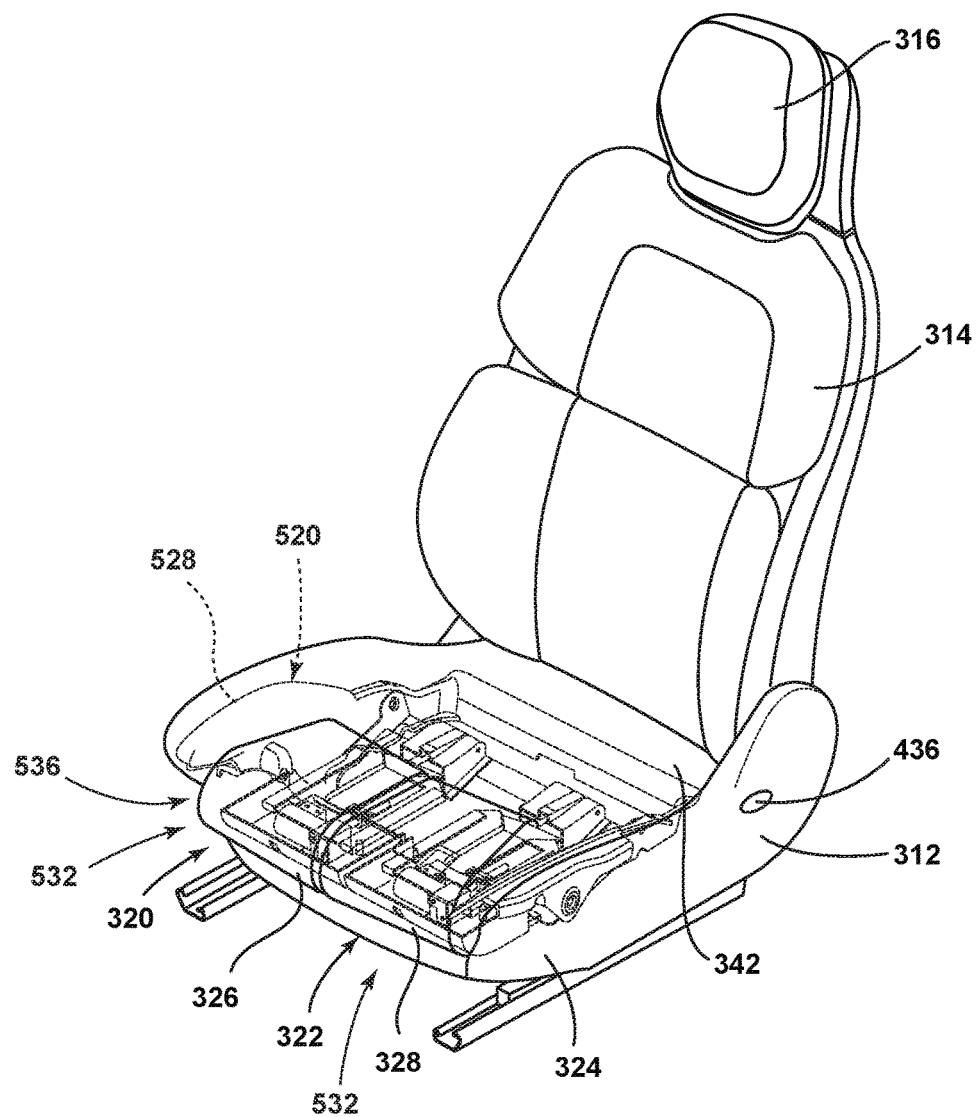
FIG. 7 is a perspective view of the vehicle seating assembly of FIG. 6.

Referring to FIGS. 6 and 7, reference numeral 310 generally designates a vehicle seating assembly for a vehicle 308 having a lower seat 312 and an upwardly extending seatback 314. The seatback 314 supports a headrest 316 thereon. The seatback 314 is pivotally coupled with the lower seat 312, such that the seatback 314 can be moved between upright and inclined positions. The headrest 316 is operably, and preferably slidably, coupled with the seatback 314 and also positioned in a variety of positions relative to the seatback 314 to support the head and neck of a driver or a passenger.

Referring again to FIGS. 6 and 7, the lower seat 312 includes a seat frame 318 to which a first and second leg support 320, 322 are pivotally coupled with a forward portion 324 of the lower seat 312. The first leg support 320 is preferably operable between raised and lowered positions. A first extendable member 326 is disposed beneath the first leg support 320 and is operable between an extended and a retracted position. The second leg support 322 is adjacent to and independent of the first leg support 320 and is likewise preferably pivotally coupled with the forward portion 324 of the seat frame 318, such that the second leg support 322 is operable between raised and lowered positions. A second extendable member 328 is likewise disposed beneath the second leg support 322 and is operable between extended and retracted positions.

The seat frame 318 includes first and second side members 330, 332 (FIG. 9) supported on legs 334 (FIG. 10). Laterally extending frame members 336 (FIG. 10) extend between the first and second side members 330, 332. The legs 334 are operably coupled with seat track slide assemblies 338 that are secured to a floor 340 of the vehicle 308.

Figure 8:
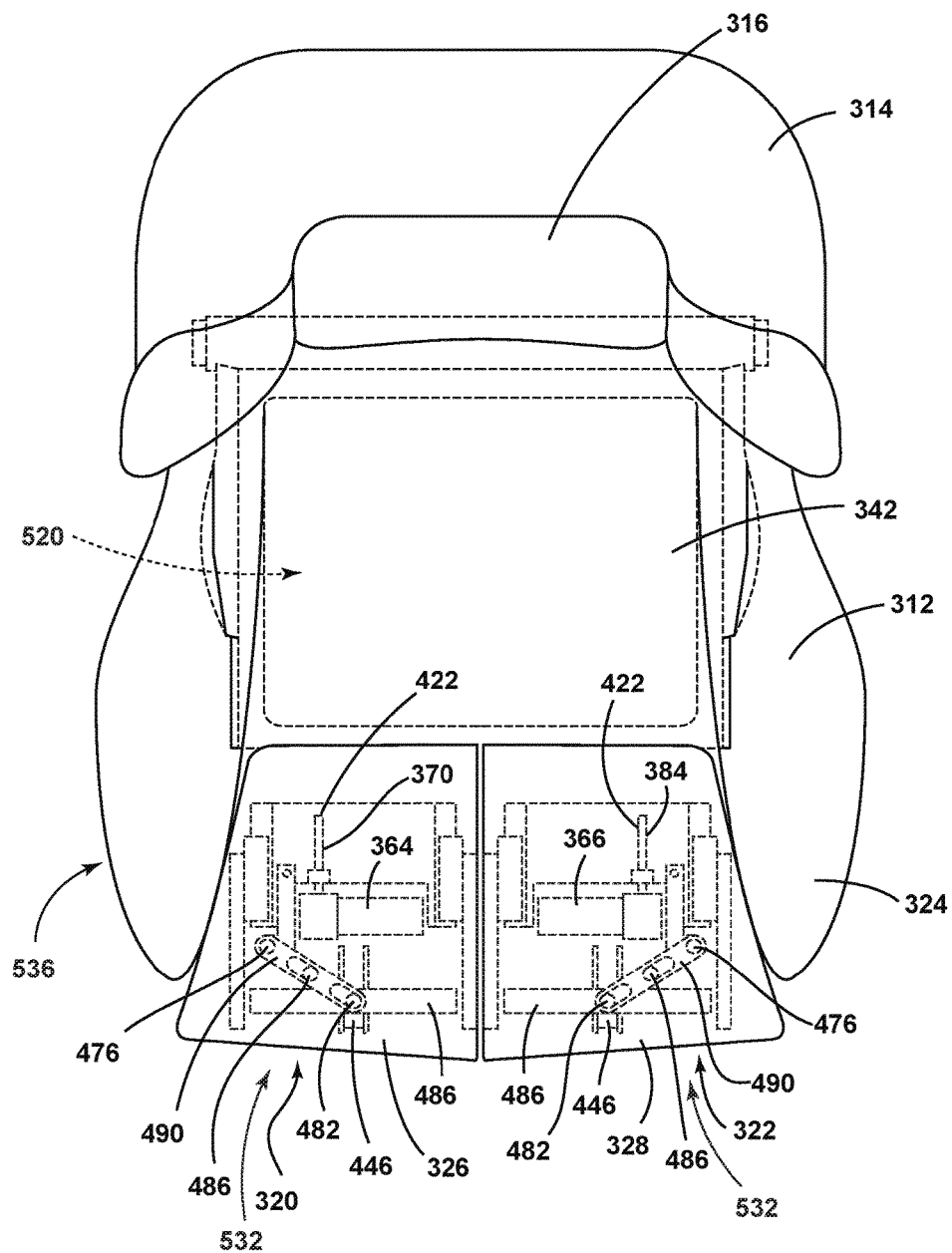
FIG. 8 is a top plan view of the vehicle seating assembly of FIG. 7.
Figure 9:
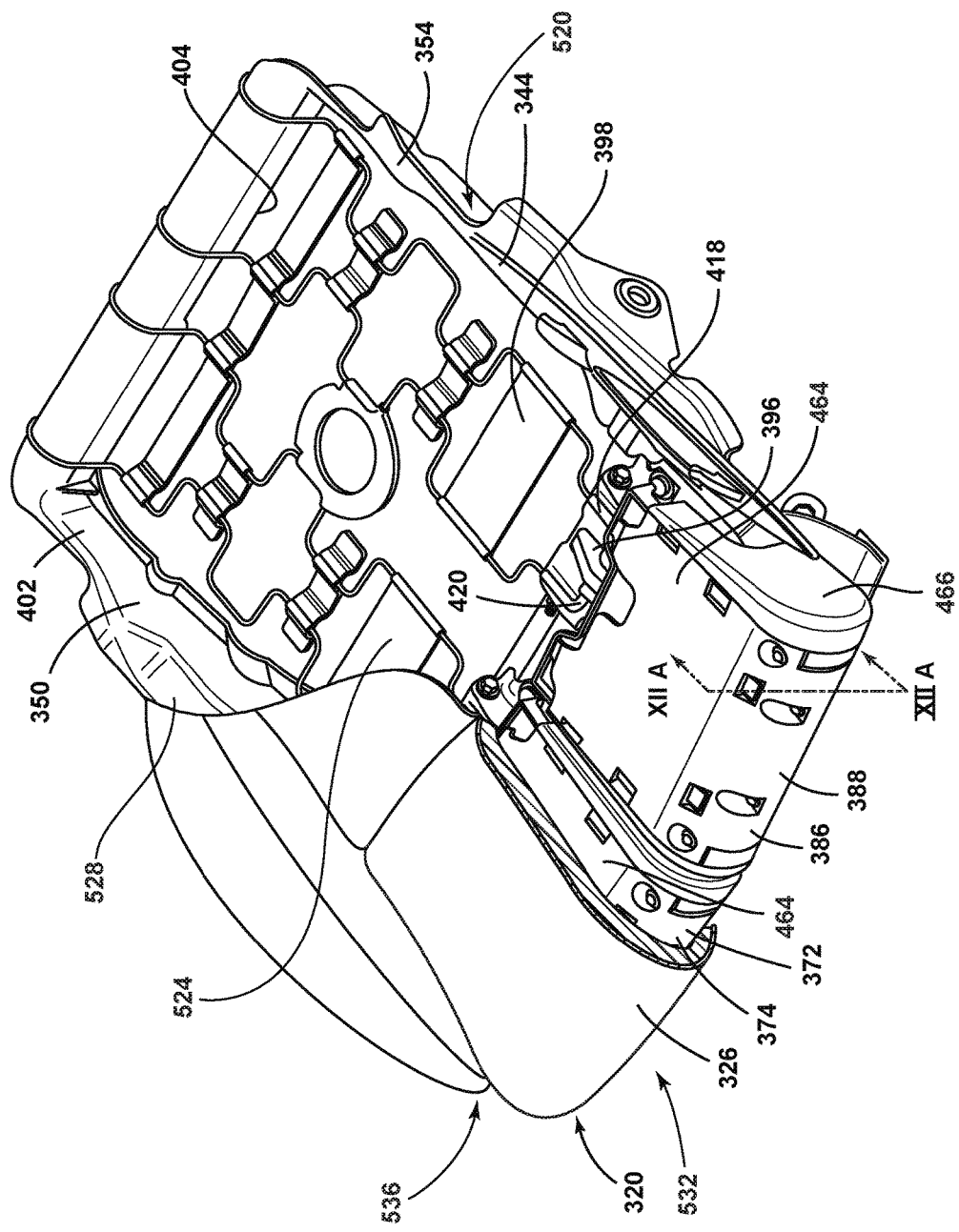
FIG. 9 is a perspective view of the cushion and interface member of the lower seat of the vehicle seating assembly of FIG. 8.

Referring now to FIGS. 8 and 9, the vehicle seating assembly 310 is generally configured to apply selective support to the underside of the legs of the driver or passenger. Specifically, as shown in FIG. 8, each leg of the driver or passenger can be independently supported by the first and second leg supports 320, 322. The first and second leg supports 320, 322 are movable between raised and lowered positions, as well as between extended and retracted positions to modify an effective seating area 342 of the vehicle seating assembly 310 and optimize accommodation of the size, shape, posture, and sitting positions of the driver or passenger.

As further shown in FIG. 8, the first extendable member 326 and the second extendable member 328 each extends forwardly from the seatback 314. The first extendable member 326 and the second extendable member 328 preferably extend forward at an angle laterally from a centerline and forwardly from an H-point to provide better leg support and comfort on the outside of the occupant's thighs in a position that naturally conforms to the natural leg-splay of a human occupant. This leg-splay angle is maintained in both the extended and retracted positions for optimized comfort in all positions. The angle is preferably between 5 and 10 degrees, and more preferably about 5 degrees, from the seat H-point along the centerline C of the lower seat 312. The split between the first extendable member 326 and the second extendable member 328 at such an angle α provides improved comfort that reduces muscle strain and improves leg and thigh support.

Referring now to FIG. 10, the vehicle seating assembly 310 includes an interface member 344 that is supported over the seat frame 318. The interface member 344 is positioned between the seat frame 318 and the upper portion 346 of the lower seat 312. The interface member 344 is disposed behind the first and second leg supports 320, 322 and in front of the seatback 314. The interface member 344 includes a pivot rod 348 that extends between first and second sides 350, 352 of the interface member 344. Additionally, a rear portion 354 of the interface member 344 includes a frame engagement component 356 that secures the interface member 344 to the seat frame 318. The pivot rod 348 is coupled with a pivotable base plate 358 situated beneath the first and second extendable members 326, 328.

As shown in FIG. 10, first and second support bases 360, 362 support the first and second leg supports 320, 322, respectively. The first and second support bases 360, 362 are operably coupled with first and second motors 364, 366, respectively. The first motor 364 is operably coupled with a drive shaft 370. The drive shaft 370 is capable of laterally translating a first support body 372 that includes a first movable housing 374 that is slidingly engaged by a pair of rails 376 mounted on each lateral side of the support base 360. A pair of slide tracks 380 mounted on the lateral side of the interior of the first movable housing 374 engages the rails 376 to allow the first movable housing 374 to slide forward and backwards relative to the first support base 360, as will be further discussed below, and between extended and retracted positions. Similarly, the second motor 366 is operably coupled with a drive shaft 384. The drive shaft 384 is capable of laterally translating a second support body 386 of the second leg support 322 between extended and retracted positions. The second support body 386 also includes a second movable housing 388 that is slidingly engaged by a pair of rails 390 mounted on each lateral side of the second support base 362. A pair of slide tracks 394 mounted on the lateral sides of the interior of the second movable housing 388 (see FIG. 11B) engages the rails 390 to allow the second movable housing 388 to slide forward and backwards relative to the second support base 362 between extended and retracted positions (see FIGS. 14A and 14B).

Referring again to FIG. 10, the interface member 344 includes suspension assembly 398 that supports a seat cushion 400. Preferably, the interface member 344 has a shape that largely complements the shape of the seat cushion 400. Specifically, the interface member 344 includes a body 402 defining an aperture 404 configured to receive the suspension assembly 398, which supports the seat cushion 400. At the same time, first and second wings 406, 408 extend from the body 402 and are configured to support first and second side cushions 410, 412 of the seat cushion 400. The seat cushion 400 is supported above the suspension assembly 398 and is protected by a cushion cover stock 414. It is anticipated that the cushion cover stock 414 could be any of a number of materials, including traditional fabrics, as well as leathers, vinyl, and fabric material. The laterally extending pivotable base plate 358 is positioned below the first and second leg supports 320, 322 and is coupled to the seat frame 318. The laterally extending pivotable base plate 358 assists in guiding the first and second leg supports 320, 322 between the various positions, and, at the same time, provides additional rigidity to the seat frame 318 of the vehicle seating assembly 310.

Referring now to FIGS. 11 and 12, the first and second leg supports 320, 322 will be discussed in further detail. The first and second leg supports 320, 322 are configured to engage the interface member 344 of the vehicle seating assembly 310. Specifically, the first and second support bases 360, 362 are pivotally coupled via bracket 396 with and pivot about the forward elements 418 of the suspension assembly 398 at pivot point 420, as shown in FIGS. 9 and 10. The first and second support bases 360, 362 are thus rotatably and fixedly coupled with the interface member 344 of the vehicle seating assembly 310.

In a preferred embodiment, the first and second support bases 360, 362 are operable between the raised and lowered positions about the pivot point 420. Preferably, each of the first and second support bases 360, 362 are biased to the raised position. It is generally contemplated that the support body 372 of the first leg support 320 and the support body 386 of the second leg support 322 may be movable to the raised position and the lowered position via an actuation assembly operably coupled with a motor (not shown). Alternatively, adjustment of the first and second leg supports 320, 322 may be made manually via a gear system, as understood by one having ordinary skill in the art.

In order to effect fore and aft motion of the first and second leg supports 320, 322, the first and second electric motors 364, 366 of the first and second leg supports 320, 322, respectively, are positioned on and affixed to the first and second support bases 360, 362. The first and second motors 364, 366 are operably coupled with the drive shafts 370, 384, respectively. Each drive shaft 370, 384 includes a screw gear 422 disposed thereon that engages a gear nut 424 disposed on and affixed to the interior of the first and second movable housing 374, 388. The screw gear 422 is thus mounted to the first and second support bases 360, 362 and is rotatably engaged with the gear nut 424 disposed on each of the first and second movable housings 374, 388, which allows for linear translation of the first and second leg supports 320, 322 between the extended and retracted positions, as discussed below.

Referring again to FIGS. 12 and 13, each of the first and second leg supports 320, 322 includes a slide assembly 426 comprising the aforementioned rails 376, 390 mounted on the first and second support bases 360, 362 and the slide tracks 380, 394 mounted within the first and second movable housings 374, 388. The tracks 380, 394 of the support bodies 372, 386 of the first and second leg supports 320, 322 are configured to receive the rails 376, 390 mounted on the first and second support bases 360, 362. The support bodies 372, 386 are thereby configured to engage the slide assembly 426.

Figure 14A:
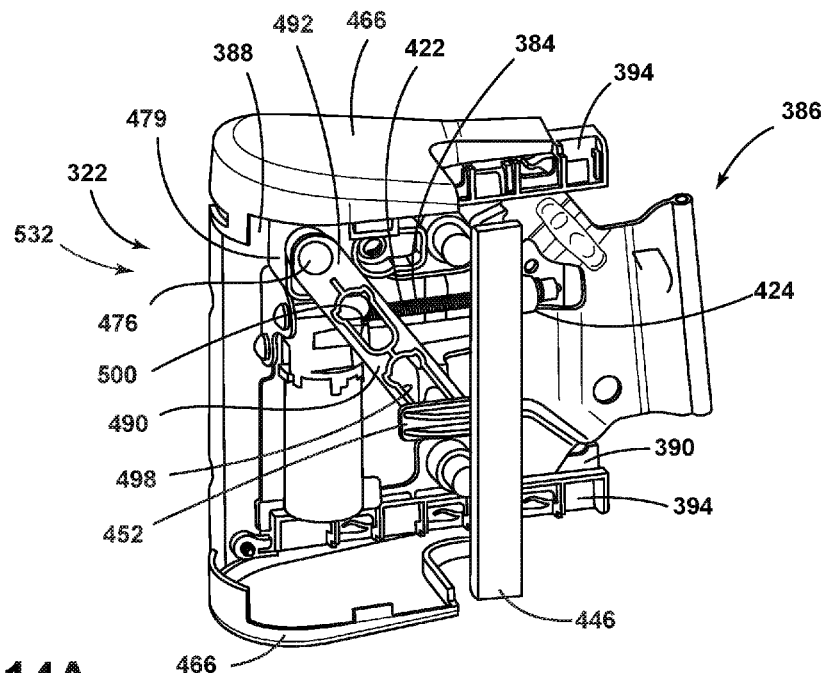
FIG. 14A is a bottom front perspective view of the extendable member of the leg support of the lower seat of the vehicle seating assembly of the present invention with the lower clamshell of the movable housing removed illustrating the leg supports in a retracted position.
Figure 14B:
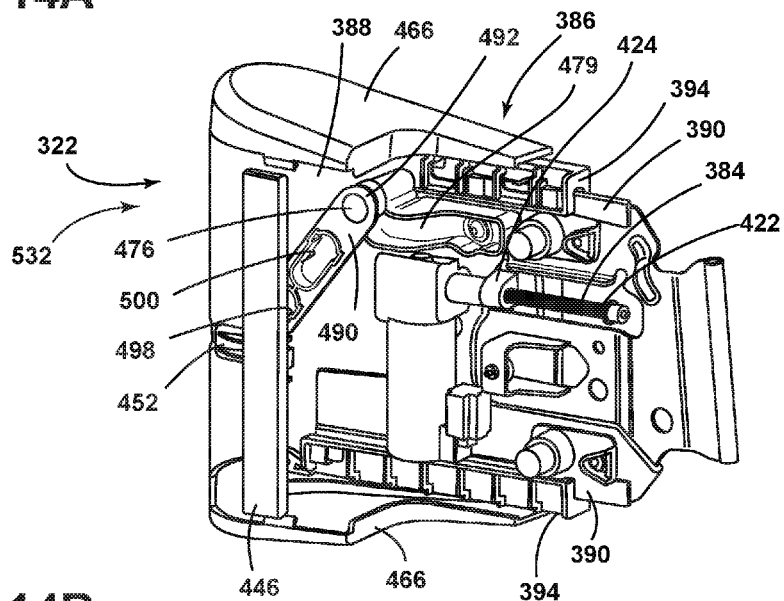
FIG. 14B is a bottom rear perspective view of the extendable member of the leg support of the lower seat of the vehicle seating assembly of the present invention with the lower clamshell of the movable housing removed illustrating the leg supports in an extended position.

The gear nut 424, as noted above, is mounted to an interior surface of each of the first and second movable housings 374, 388 (as shown in FIGS. 14A and 14B) and is linearly translatable via the screw gear 422 between fore and aft positions. As described in further detail below, when the gear nut 424 is in the aft position, the relevant leg support 320 or 322 is in the retracted position. Similarly, when the gear nut 424 is in the forward position, the relevant leg support 320 or 322 is in the extended position. The first and second extendable members 326, 328 are thereby operatively coupled with the forward portion 324 of the lower seat 312.

Referring again to FIGS. 12 and 13, a protective wrap 430 is disposed about an upper, lower, and forward portion of each support body 372, 386. The protective wrap 430 is itself covered by a leg support trim cover stock 432 over a cushion layer 434, the cushion layer 434 being disposed between the trim cover stock 432 and protective wrap 430. The leg support cover stock 432 and the cushion layer 434 thereby conceal the protective wrap 430.

Figure 12A:
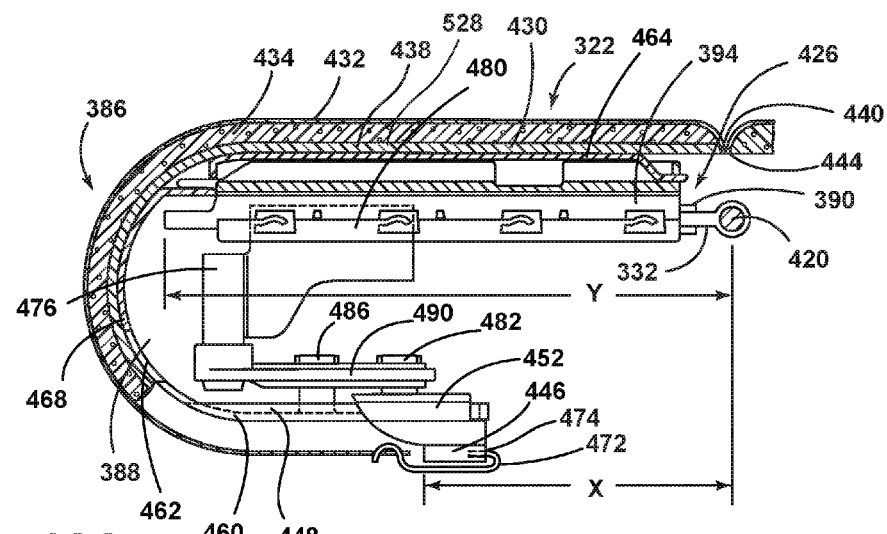
FIG. 12A is a partial side cross-sectional elevational view taken at line XIIA-XIIA of FIG. 9 illustrating the leg support in a retracted position.
Figure 12B:
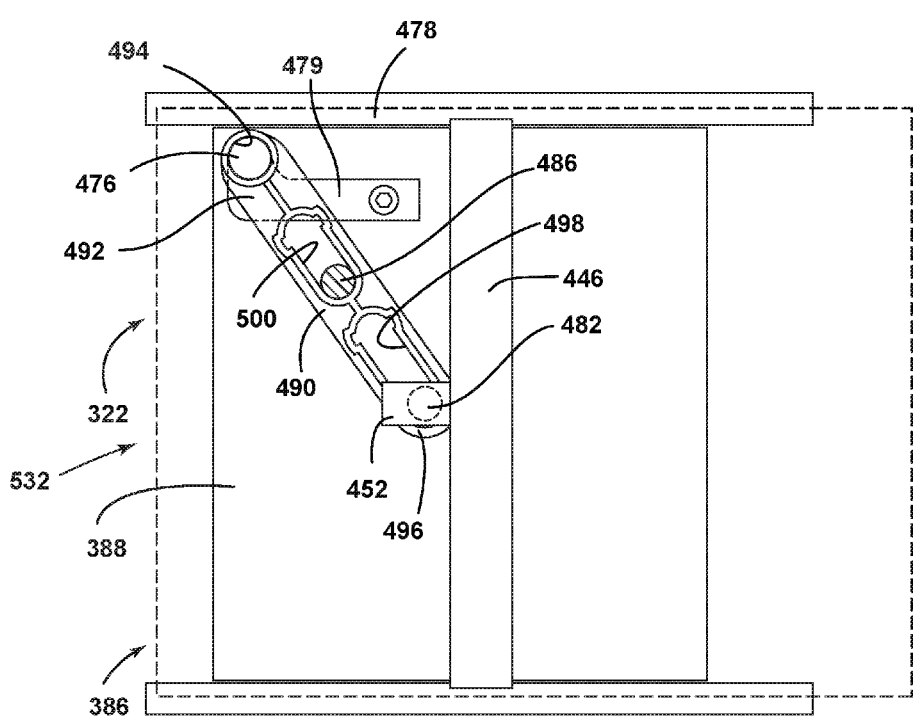
FIG. 12B is a bottom view of the extendable member of the leg support of the lower seat of the vehicle seating assembly of the present invention illustrating the leg support in a retracted position.

Referring now to FIGS. 12A and 12B, the vehicle seating assembly 310 is illustrated with the second leg support 322 moved to an initial position. In the initial position, the second leg support 322 is in the retracted position. In this initial position, the effective seating area 342 of the lower seat 312 has not been enlarged. Accordingly, the effective seating area 342 is generally configured to support a driver or passenger that is smaller in stature. In the event the driver or passenger has a larger stature and wishes to change the effective seating area 342 of the vehicle seating assembly 310, then the first and second leg supports 320, 322 can be extended independently, preferably at an optimized lateral angle α of between 5 to 10 degrees relative the centerline C.

Figure 13A:
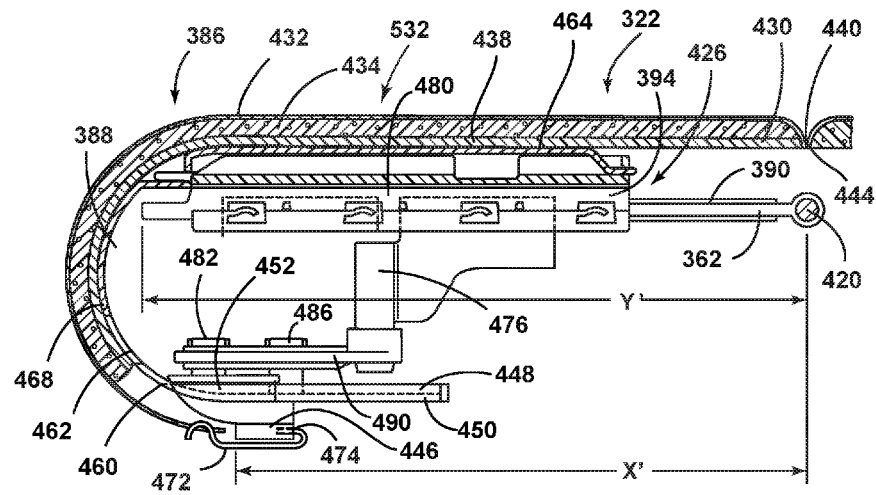
FIG. 13A is a partial side cross-sectional elevational view taken at line XIIA-XIIA of FIG. 9 illustrating the leg supports in an extended position.
Figure 13B:
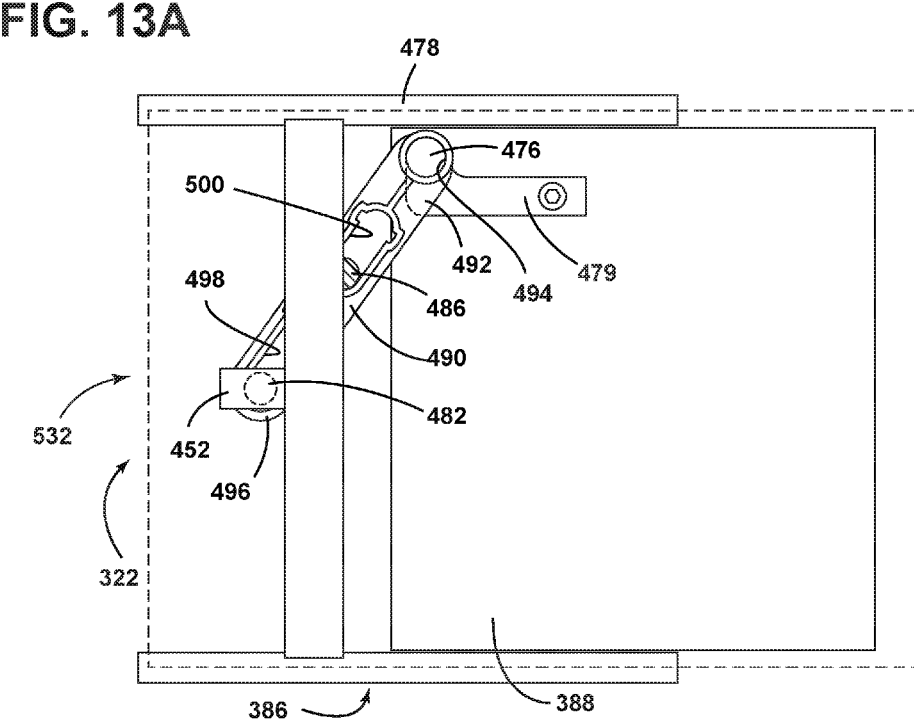
FIG. 13B is a bottom view of the extendable member of the leg support of the lower seat of the vehicle seating assembly of the present invention illustrating the leg supports in an extended position.

Referring now to FIGS. 13A and 13B, in the illustrated embodiment, the second leg support 322 has been translated to the extended position. To move the second leg support 322 to the extended position, the driver or passenger would simply engage a toggle switch 436 on the lower seat 312 that is operably coupled to the second motor 366. The second motor 366 then activates, which turns the drive shaft 384 that is coupled with the screw gear 422. Notwithstanding the foregoing, it is contemplated that the benefits of the present disclosure may also be obtained in a manual system that does not employ motor 364, 366, but rather relies upon manual rotational input, as is known in the art.

As shown in FIGS. 14A and 14B, as the screw gear 422 rotates, the gear nut 424 attached to the second movable housing 388 begins to move relative to the screw gear 422. Specifically, when the second motor 366 operates in a first direction, the screw gear 422 rotates such that threads of the screw gear 422 push internal threads of the gear nut 424, which translates the gear nut 424 and the second leg support 322 away from the interface member 344 (corresponding to the extended position of the second leg support 322). When the second motor 366 operates in a second direction, the screw gear 422 turns in a second direction opposite the first direction, such that the gear nut 424 is drawn toward the interface member 344 (corresponding with the retracted position of the second leg support 322).

As the screw gear 422 rotates in the first direction, the support body 386 of the second leg support 322 is pushed outwardly away from the interface member 344. At the same time, the second support base 362 maintains position and does not move. As the gear nut 424 is rigidly mounted to the interior surface 488 of the second movable housing 388, the second leg support 322 is moved forward relative the first support base 360. Thus, the interaction of the rail 390 with the tracks 394 allows for the second leg support 322 to extend relative to the first leg support 320.

Although the electrical motor 366 is preferably disclosed as being mounted on the second support base 362 and the driven gear nut 424 is mounted on the interior surface of the second movable housing 388, the components can be reversed. That is, the motor 366 may be mounted on the second movable housing 388, and the driven gear nut 424 may be mounted on the second support base 362. In the event the driver or passenger also wanted the first leg support 320 to be moved to the extended position, the driver or passenger could engage in the same behavior to actuate the first motor 364, which would then force the support body 372 of the first leg support 320 outward in a similar fashion to that described above with reference to the second leg support 322.

A beneficial feature of the present disclosure is that as the first and second movable housing 374, 388 extend forwardly beneath the protective wrap 430, cushion layer 434, and cover stock 432 of the leg supports 320, 322, the cover stock 432, cushion layer 434, and protective wrap 430 immediately beneath the occupant's thigh does not move. The cover stock 432 and cushion cover stock 414 also form a substantially smooth surface that does not collect debris throughout the motion of the extendable members 326, 328. That is, the cover stock 432 for the leg supports 320, 322, which forms a substantially rectangular panel, is at least partially disposed above an upper surface 438 of each of the first and second movable housings 374, 388 and is at least partially disposed below each of the first and second movable housings 374, 388.

Each cover stock 432 for the leg supports 320, 322 has a first fixed upper edge 440 and a second movable lower edge 442. The first fixed upper edge 440 of the cover stock 432 is fixedly attached to the cushion cover stock 414 over the cushion to form a continuous uninterrupted lateral seam or bite 444 between the first fixed upper edge 440 of the cover stock 432 and the cushion cover stock 414. The second movable lower edge 442 of the cover stock 432, located beneath each of the first and second leg supports 320, 322, is fixedly attached to an attachment member 446, which operates to maintain tension in the cover stock 432 of the leg supports 320, 322 during the extension and retraction operation.

The attachment member 446 is part of an articulating system that uniquely maintains the aforementioned tension in the cover stock 432 of the leg supports 320, 322. Each of the movable housings 374, 388 is provided with an articulating mechanical linkage system operatively coupling the movable housing 374, 388 to the second movable lower edge 442 of the trim cover stock 432 to maintain tension on the trim cover stock 432 as either of the first and second extendable members 326, 328 is operated between the extended and retracted positions. Each of the movable housings 374, 388 of the first and second extendable members 326, 328 further includes an integrated track 448 disposed on a lower surface 450 of the movable housing 374, 388, and a trim payout slider 452 operably coupled with the integrated track 448 and adapted for fore and aft motion therein. The trim payout attachment member 446 is also operably coupled with the trim payout slider 452.

As the integrated track 448 is disposed on the lower surface 450 of the movable housing 374, 388, the trim payout slider 452 is effectively concealed from view and is relatively free from interference in its operation. The trim payout slider 452 is operably coupled with the integrated track 448 and adapted for fore and aft motion therein, and the trim payout attachment member 446 is operably coupled with the second movable lower edge 442 of the trim cover stock 432 and is operably coupled with the trim payout slider 452. The trim payout slider 452 is thus operably coupled with the second movable lower edge 442 of the cover stock 432 via the trim payout attachment member 446, and is thus capable of moving the second movable lower edge 442 of the cover stock 432, as discussed further below.

Figure 11A:
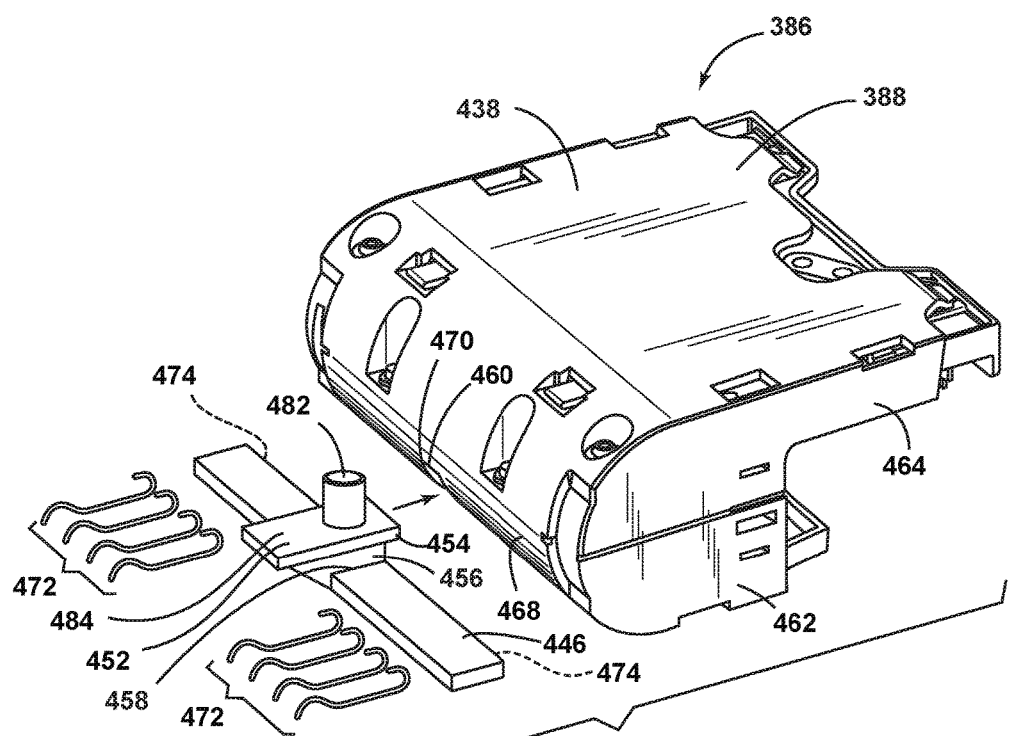
FIG. 11A is a perspective front and side view of the movable housing of the extendable member of the leg supports of the lower seat of the vehicle seating assembly of FIG. 7.

The trim payout slider 452 preferably has a pair of outwardly extending and opposing shoulders 454 above a central body 456 and a lower rail 458. Preferably, the lower rail 458 is integral with the trim payout attachment member 446 coupled with the trim payout slider 452, as shown in FIG. 11A. The longitudinal integrated track 448 preferably includes a longitudinal slot 460 on the lower surface 450 of the movable housing 374, 388 that receives the central body 456 of the trim payout slider 452, the longitudinal slot 460 having a lateral width less than the lateral width of each of the outwardly extending and opposing shoulders 454 and the lower rail 458, whereby the trim payout slider 452 is retained in the longitudinal slot 460.

The movable housings 374, 388 include mating lower and upper clamshells 462, 464 and a pair of lateral endcaps 466 to form therein a cavity within which the tracks 394 are received and mounted, the tracks 380, 394 disposed on each interior side each engage one of the slide rails 376, 390 of the support bases 360, 362 and upon which either of the first and second extendable members 326, 328 slides between the extended and retracted positions. A partially forward facing surface 468 of the lower clamshell 462 of the movable housings 374, 388 has a forward facing opening 470 that is continuous with the longitudinal slot 460. The opening 470 has at least a portion of its lateral width greater than the lateral width of the outwardly extending and opposing shoulders 454 of the trim payout slider 452, whereby during assembly, the trim payout slider 452 may be inserted into the longitudinal slot 460 through forward facing opening 470 and thereby be adapted for slidable motion within the longitudinal slot 460.

The second moveable lower edge 442 of the trim cover stock 432 may be attached along the width of the trim payout attachment member 446 via a number of different methods, of which those skilled in the art will be aware. Preferably, a plurality of retainers 472 are passed through the second moveable lower edge 442 of the cover stock 432 and are placed in regularly spaced intervals within openings 474 across the lateral width of the cover stock 432, so as to securely grasp the second moveable lower edge 442 of the cover stock 432 along its entire width and maintain an even tension along the same.

Figure 11B:
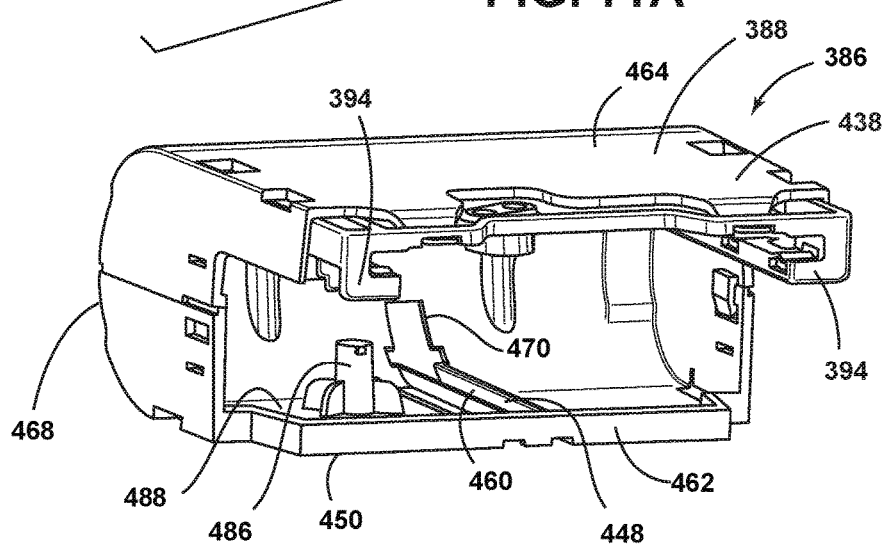
FIG. 11B is a perspective rear and side view of the movable housing of the extendable member of the leg supports of the lower seat of the vehicle seating assembly of FIG. 7.

Preferably, the linkage system employs a first fixed pivot 476 disposed within the cavity within the movable housing 374, 388. The first fixed pivot 476 is preferably mounted to the support base 360, 362 proximate an outer edge 478 of the movable housing 374, 388. The first fixed pivot 476 may be integrally formed as part of the support base 360, 362 as an extending boss or, preferably, as a separate bracket 479 may be fixedly attached to a forward portion 480 of the support base 360, 362. A second displaceable pivot 482 is disposed within the cavity and is preferably mounted to an upper portion 484 of the trim payout slider 452 proximate the lateral center of the movable housing 374, 388. A third fixed pivot 486 is disposed within the cavity and is mounted to an interior surface 488 of the lower clamshell 462 of movable housings 374, 388 intermediate the first and second pivots. Preferably, the third fixed pivot 486 is formed as a molded boss into the interior surface 488 of the lower clamshell 462 of the movable housing 374, 388, as best shown in FIG. 11B.

The linkage system also includes a pivot bracket 490 having a first end pivotably coupled with the first fixed pivot 476, the second displaceable pivot 482, and the third fixed pivot 486. That is, the pivot bracket 490 is pivotally connected at a first end 492 to the first fixed pivot 476 mounted to the support base 360, 362 via an opening 494 having a diameter that rotatably accepts the diameter of the first fixed pivot 476. The pivot bracket 490 is also pivotally connected at a second end 496 to the second displaceable pivot 482 mounted to trim payout slider 452 via an elongated end slot 498 extending longitudinally within a portion of the pivot bracket 490. The end slot 498 has a width that rotatably accepts the diameter of the second displaceable pivot 482. The second displaceable pivot 482 on the trim payout slider 452 is thereby operably coupled with the movable lower edge 442 of the trim cover stock 432 via the attachment member 446, as described above. The pivot bracket 490 further has an intermediate slot 500 disposed intermediate the first and second ends 492, 496 of the pivot bracket 490. The intermediate slot 500 also extends longitudinally within a portion of the pivot bracket 490. The intermediate slot 500 likewise has a width that rotatably accepts the diameter of the third fixed pivot 486. The intermediate slot 500 is thereby pivotably coupled with and engaged by the third fixed pivot 486 disposed within the cavity and mounted to the interior surface 488 of the movable housing 374, 388 intermediate the first and second ends 492, 496 of the pivot bracket 490.

Figure 15A:
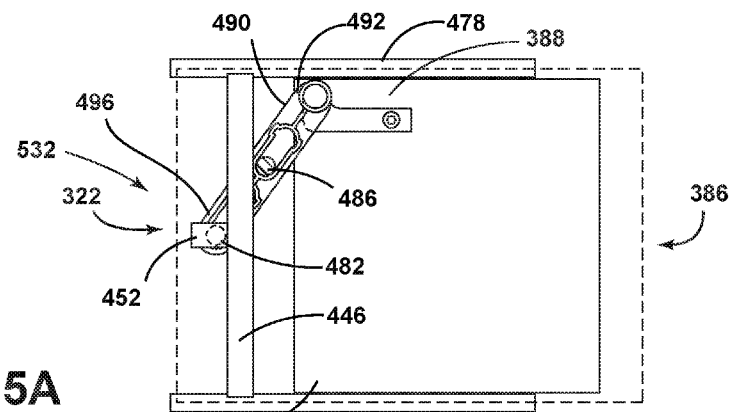
FIGS. 15A-C are a series of bottom views of the extendable member of the leg support of the lower seat of the vehicle seating assembly of the present invention illustrating the leg supports in the extended, partially retracted, and fully retracted positions.
Figure 15B:
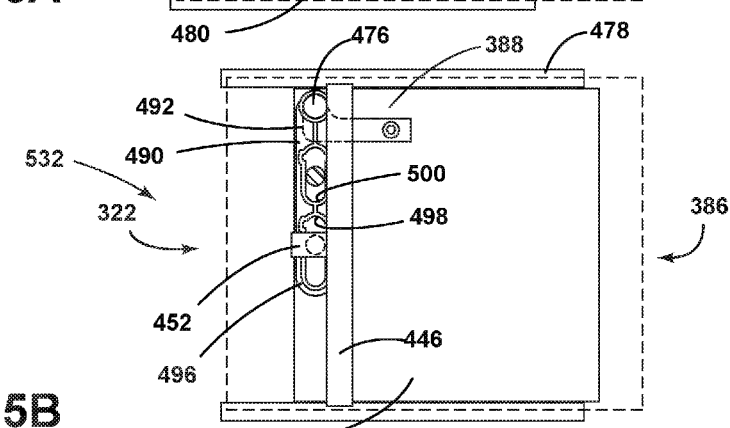
Figure 15C:
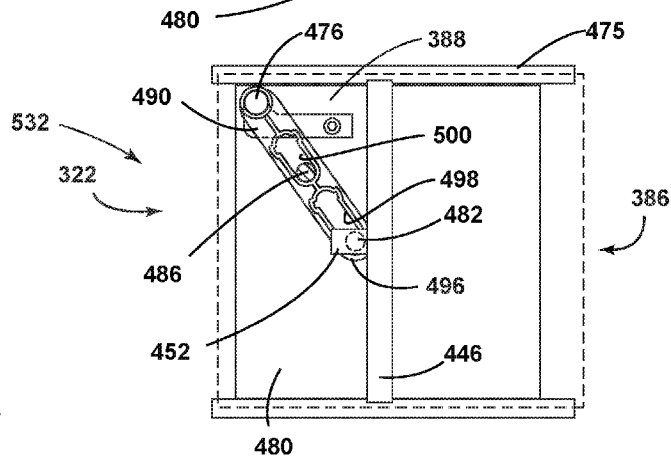

With the second end 496 of the pivot bracket 490 coupled with and engaging the trim payout slider 452, where the end slot 498 is pivotably coupled with the second displaceable pivot 482 on the trim payout slider 452 and the intermediate slot 500 is pivotably coupled with the third fixed pivot 486 on the movable housings 374, 388, extension of either of the first or second extendable members 326, 328 from the retracted position to the extended position inherently moves the third fixed pivot 486 mounted on the interior surface 488 of the movable housing 374, 388 forward within the intermediate slot 500 and thereby urges the pivot bracket 490 forward. The end slot 498 pivotably coupled with the second displaceable pivot 482 mounted on the trim payout slider 452 is thereby urged forward along the integrated track 448, as is the attachment member 446 and the second movable lower edge 442 of the cover stock 432, as shown in FIGS. 15A-15C. Retraction of either of the first or second extendable members 326, 328 from the extended position to the retracted position moves the third fixed pivot 486 rearward within the intermediate slot 500 and thereby urges the pivot bracket 490 rearward, whereupon the end slot 498 pivotably coupled with the second displaceable pivot 482 mounted on the trim payout slider 452 urges the trim payout slider 452 rearward within the integrated track 448, along with the attachment member 446 and the second movable lower edge 442 of the cover stock 432, as shown in FIGS. 15A-15C.

Thus, as the trim payout slider 452 is moved forward and rearward, the operably coupled trim payout attachment member 446 and the second movable lower edge 442 of the cover stock 432 are moved forward and rearward. Preferably, the longitudinal displacement of the second movable lower edge 442 of the cover stock 432, as well as the trim payout slider 452 and attachment member 446, between the extended position and the retracted position of the extendable member position is about twice the longitudinal displacement of the movable housing 374, 388 of the extendable members 326, 328 between the extended position and the retracted position. That is, as best shown in FIGS. 12A and 12B, the distance $X^1$-X is about twice the distance $Y^1$-Y.

Notably, the first and second leg supports 320, 322 may be at the lowered position, the raised position, or any position there between simultaneously. However, the first and second leg supports 320, 322 may also be placed at different positions. For example, the first leg support 320 may be at the lowered position, while the second leg support 322 may be at the raised position. Moreover, at the same time, regardless of the raised or lowered positions of the first and second leg supports 320, 322, the first and second leg supports 320, 322 may also be at the extended or retracted positions. Again, the first and second leg supports 320, 322 may be placed at the retracted position or the extended position simultaneously. Alternatively, the first and second leg supports 320, 322 may be positioned differently. For example, the first leg support 320 may be at the lowered position and the retracted position, while the second leg support 322 may be at the extended position and the raised position.

As generally noted above, it will be understood that the first and second leg supports 320, 322 can be in the raised or lowered position, or any position there between, and at the same time, be in the extended or retracted position. Movement of the first and second leg supports 320, 322 between the raised and lowered positions is independent of movement of the first and second leg supports 320, 322 between the extended and retracted positions.

The vehicle seating assembly as disclosed herein includes first and second independently movable leg supports 320, 322 configured to provide independent support to the legs of a driver or passenger. For example, for a driver, frequently, the right leg of the driver is in an extended position to actuate the pedals. At the same time, particularly in vehicles equipped with an automatic transmission that does not require the manipulation of a clutch pedal, the left leg of the driver may be retracted to provide comfort to the driver. The vehicle seating assembly 310 as disclosed herein can allow for additional support under the right leg of the driver, thereby minimizing the likelihood that the endurance of the driver will wane over long trips. The vehicle seating assembly 310 as disclosed herein also provides additional comfort as the leg supports 320, 322 can be specifically moved and adjusted to conform to the preferred seating style of a particular driver or passenger.

Referring further to FIGS. 1-5, the seating assembly 114 includes the seatback 118 and the seat base 122. The seat base 122 is operably coupled to the seatback 118. The seat base 122 includes a first suspension assembly 520 of the seat base 122. The first suspension assembly 520 includes the suspension member 214 that is operably coupled to the seat pan 142, one or more tunable springs 524 positioned across the seat pan 142, flexible side bolsters 528 of the seat pan 142, the seat cushion assembly 138 positioned above the suspension member 214, and articulated seat side bolsters 202 of the seat cushion assembly 138. It will be understood by one of ordinary skill in the art that the seating assembly 114 illustrated in FIGS. 1-5 can include features illustrated for the vehicle seating assembly 310 of FIGS. 6-15C. For example, the seat base 122 can further includes a second suspension assembly 532. The second suspension assembly 532 includes the plurality of independent thigh supports 166 operably coupled to the forward portion 324 (FIG. 7) of the seat pan 142.

Referring again to FIGS. 1-5, the seating assembly 114 includes the seatback 118 and the seat base 122. The seat base 122 is operably coupled to the seatback 118. A dual suspension system 536 is positioned in the seat base 122. The dual suspension system 536 includes the first suspension assembly 520 and the second suspension assembly 532. The first suspension assembly 520 supports a posterior of an occupant of the seat base 122. The second suspension assembly 532 includes the independent thigh supports 166. The first and second suspension assemblies 520, 532 are capable of independent operation relative to one another. The first suspension assembly 520 further includes the seat pan 142 and the seat cushion assembly 138. The seat cushion assembly 138 is positioned above the seat pan 142. The seat pan 142 can include seat side bolsters 202 that are flexible such that the movements of an occupant of the seat base 122 induce deformation of the seat pan 142 in a resilient manner to provide support and improved comfort to the occupant. The suspension member 214 can be operably coupled to the seat pan 142. The seat pan 142 can include one or more tunable springs 524 that are positioned across the seat pan 142 to provide customizable support to the occupant. The seat cushion assembly 138 can include articulation of the seat side bolsters 202.

Referring now to FIGS. 6-10, vehicle seating assemblies 310 often become uncomfortable for an occupant of the vehicle seating assembly 310 during long rides in the vehicle 308. The length of time the occupant is able to occupy the vehicle seating assembly 310 prior to discomfort can correlate in a consumers mind to the perceived quality of the vehicle seating assembly 310, and by extension the overall quality of the vehicle 308. Accordingly, providing the consumer with a comfortable experience in the vehicle 308 can result in greater consumer satisfaction. The vehicle seating assembly 310 of the present disclosure provides the consumer with a comfortable seating solution that moves and flexes as the occupant/consumer moves in the vehicle seating assembly 310. The vehicle seating assembly 310 accomplishes this improved comfort and conformability, at least in part, by providing the dual suspension system 536. The dual suspension system 536 includes the first suspension assembly 520 and the second suspension assembly 532. The first suspension assembly includes the suspension assembly 398 that is operably coupled to the interface member 344, one or more tunable springs 524 positioned across the interface member 344, flexible side bolsters 528 of the interface member 344, the upper surface 346 of the lower seat 312 positioned above the suspension assembly 398, and first and second side cushions 410, 412 of the upper surface 346 of the lower seat 312. The tunable springs 524 can be customized by the occupant to provide the amount of support or compliance (i.e. give) of the vehicle seating assembly 310 that the occupant prefers. The first suspension assembly 520 supports a posterior of the occupant independent from the legs of the occupant. The first suspension assembly 520 conforms and moves with the occupant as the occupant shifts his or her weight in the vehicle seating assembly 310 and during vehicle maneuvers. The first suspension assembly 520 can also absorb at least some of the jarring movements of the vehicle 308 caused by, for example, pot holes and bumps in the road.

Referring again to FIGS. 6-10, the second suspension assembly 532 includes the first and second movable housings 374, 388 operably coupled to the forward portion 324 of the interface member 344. The independent support of the occupant's legs by the first and second movable housings 374, 388 allows the occupant to shift the position of their legs and maintain support of at least the thigh portion of his or her legs. When driving, the occupant often exerts different amounts of pressure on the vehicle seating assembly 310 in the thigh region of the vehicle seating assembly 310 due to one leg operating the accelerator and the other leg resting on the floor 340. Providing independent support of the thighs of the occupant allows for better support of each leg and can help improve blood flow by decreasing a pinching affect often caused when an occupant sits down.

Referring to FIG. 12A-13B, the first and second movable housings 374, 388 are capable of independent operation between an extended position (FIGS. 13A and 13B) and a retracted position (FIGS. 12A and 12B). The first and second movable housings 374, 388 can be actuated between the extended position and the retracted position. The actuation of the first and second movable housings 374, 388 between the extended position and the retracted position can be accomplished, for example, by the first motor 364 and the second motor 366 (FIG. 10). The first motor 364 can actuate the first leg support 320 and the second motor 366 can actuate the second leg support 322. Additionally, the first and second movable housings 374, 388 can be independently operable between a raised position and a lowered position. The first and second movable housings 374, 388 move between the raised and lowered position by pivoting about the pivot point 420 of the first and second support bases 360, 362.

Referring again to FIG. 12A-13B, the first and second movable housings 374, 388 can further include the first support base 360 and the second support base 362 that correspond with the first leg support 320 and the second leg support 322, respectively. The first and second support bases 360, 362 can operably couple to the forward portion 324 of the interface member 344 (FIG. 10). The first movable housing 374 and the second movable housing 388 slidably engage the first and second support bases 360, 362, respectively. The cover stock 414 (FIG. 10), such as a trim cover stock, can be partially positioned above the upper surface 438 of the first and second movable housings 374, 388. The first and second movable housings 374, 388 can include the linkage system that is configured to articulate the first and second movable housings 374, 388 between the extended and retracted positions. The linkage system includes the first fixed pivot 476 that is positioned within the cavity of each of the first and second movable housings 374, 388. The first fixed pivot 476 is operably coupled to the first end 492 of the pivot bracket 490. The second displaceable pivot 482 is mounted to the upper portion 484 of the trim payout slider 452. The second displaceable pivot 482 is positioned within a first slot, such as the end slot 498, of the pivot bracket 490. The third fixed pivot 486 is mounted to the interior surface 488 of the lower clamshell 462 of the associated movable housing 374, 388. The third fixed pivot is positioned in a second slot, such as the intermediate slot 500, of the pivot bracket 490.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly comprising:
   a seatback;
   a seat base operably coupled to the seatback;
   a first suspension assembly of the seat base, the first suspension assembly comprising:
     a suspension member operably coupled to a seat pan;
     one or more tunable springs positioned across the seat pan;
     flexible side bolsters of the seat pan;
     a seat cushion assembly positioned above the suspension member;
     articulated seat side bolsters of the seat cushion assembly; and
   a second suspension assembly of the seat base, the second suspension assembly comprising:
     a plurality of independent thigh supports operably coupled to a forward portion of the seat pan, the plurality of independent thigh supports comprising:
     a linkage system configured to articulate the independent thigh supports between extended and retracted positions, wherein the linkage system comprises:
     a first fixed pivot positioned within a cavity of a movable housing and operably coupled to a first end of a pivot bracket;
     a second displaceable pivot mounted to an upper portion of a trim payout slider and positioned within a first slot of the pivot bracket; and
     a third fixed pivot mounted to an interior surface of a lower clamshell of the movable housing and positioned in a second slot of the pivot bracket.

2. The vehicle seating assembly of claim 1, wherein the plurality of independent thigh supports are independently operable between an extended position and a retracted position.

3. The vehicle seating assembly of claim 2, wherein the plurality of independent thigh supports are actuated between the extended and retracted positions by a first motor and a second motor operably coupled to first and second thigh supports of the plurality of independent thigh supports, respectively.

4. The vehicle seating assembly of claim 1, wherein the plurality of independent thigh supports are independently operable between a raised position and a lowered position.

5. The vehicle seating assembly of claim 1, wherein the plurality of independent thigh supports further comprises:
   a support base attached to the forward portion of the seat pan;
   the movable housing slidably coupled to the support base; and
   a trim cover stock partially positioned above an upper surface of the movable housing.

* * * * *